US012430458B2

(12) United States Patent
Jiang et al.

(10) Patent No.: US 12,430,458 B2
(45) Date of Patent: Sep. 30, 2025

(54) TRANSFORMED PARTIAL CONVOLUTION ALGORITHM FOR COMPOSITION DETERMINATION

(71) Applicant: Lemon Inc., Grand Cayman (KY)

(72) Inventors: Bo Jiang, Culver City, CA (US); Jian Du, Culver City, CA (US); Sagar Sharma, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 65 days.

(21) Appl. No.: 18/502,673

(22) Filed: Nov. 6, 2023

(65) Prior Publication Data

US 2025/0148108 A1    May 8, 2025

(51) Int. Cl.
| | | |
|---|---|---|
| *G06F 21/62* | (2013.01) | |
| *G06F 21/60* | (2013.01) | |
| *G06F 21/64* | (2013.01) | |

(52) U.S. Cl.
CPC ........ *G06F 21/6218* (2013.01); *G06F 21/604* (2013.01)

(58) Field of Classification Search
None
See application file for complete search history.

(56) References Cited

U.S. PATENT DOCUMENTS

| | | |
|---|---|---|
| 7,058,603 B1 | 6/2006 | Rhiando |
| 9,652,622 B2 | 5/2017 | Garfinkle et al. |
| 10,289,816 B1 | 5/2019 | Malassenet |
| 11,522,688 B2 | 12/2022 | Goodsitt et al. |
| 11,593,510 B1 | 2/2023 | Knox et al. |
| 11,704,431 B2 | 7/2023 | Kraus et al. |
| 11,868,497 B1 | 1/2024 | Jiang et al. |
| 2004/0179686 A1 | 9/2004 | Matsumura et al. |

(Continued)

FOREIGN PATENT DOCUMENTS

| | | |
|---|---|---|
| CN | 114662133 A | 6/2022 |
| CN | 116049626 A | 5/2023 |

OTHER PUBLICATIONS

Office Action dated Jul. 12, 2023 issued in U.S. Appl. No. 18/297,447.

(Continued)

*Primary Examiner* — Venkat Perungavoor
(74) *Attorney, Agent, or Firm* — Fish & Richardson P.C.

(57) ABSTRACT

Differential privacy composition determination in a secure communication is provided. A method for determining differential privacy composition includes determining a differential privacy configuration including a first privacy parameter and a second privacy parameter, determining a privacy loss distribution, and performing a partial convolution operation of the privacy loss distribution by transforming the privacy loss distribution based on a predetermined parameter, determining an integral range based on the first privacy parameter and the privacy loss distribution, transforming the privacy loss distribution based on the integral range, and performing the partial convolution operation based on the integral range. The method also includes determining the second privacy parameter based on a result of the partial convolution operation, and controlling a dataset based on the differential privacy configuration to limit access to the dataset.

20 Claims, 11 Drawing Sheets

(56) References Cited

U.S. PATENT DOCUMENTS

| | | | |
|---|---|---|---|
| 2010/0131764 | A1 | 5/2010 | Goh |
| 2011/0202764 | A1 | 8/2011 | Furukawa |
| 2012/0143922 | A1 | 6/2012 | Rane et al. |
| 2013/0212690 | A1 | 8/2013 | Fawaz et al. |
| 2016/0150047 | A1 | 5/2016 | O'Hare et al. |
| 2018/0101697 | A1 | 4/2018 | Rane et al. |
| 2019/0065775 | A1 | 2/2019 | Klucar, Jr. et al. |
| 2019/0244138 | A1 | 8/2019 | Bhowmick et al. |
| 2019/0361794 | A1 | 11/2019 | Maksyutov et al. |
| 2020/0250335 | A1 | 8/2020 | Hockenbrocht et al. |
| 2020/0358599 | A1* | 11/2020 | Baracaldo Angel ............... G06F 21/6227 |
| 2020/0401726 | A1 | 12/2020 | Lim et al. |
| 2021/0073677 | A1 | 3/2021 | Peterson et al. |
| 2021/0173856 | A1 | 6/2021 | Chitnis et al. |
| 2021/0336771 | A1 | 10/2021 | Mukherjee |
| 2021/0356258 | A1* | 11/2021 | Chen ..................... G06N 3/045 |
| 2021/0360010 | A1 | 11/2021 | Zaccak et al. |
| 2021/0399874 | A1 | 12/2021 | Polyakov et al. |
| 2022/0100899 | A1 | 3/2022 | Saillet et al. |
| 2022/0138348 | A1 | 5/2022 | Bernau et al. |
| 2022/0244988 | A1 | 8/2022 | Zhang et al. |
| 2022/0277097 | A1 | 9/2022 | Cabot et al. |
| 2022/0335450 | A1 | 10/2022 | Fenton et al. |
| 2022/0405800 | A1 | 12/2022 | Walcott et al. |
| 2023/0017374 | A1 | 1/2023 | Boehler |
| 2023/0045553 | A1 | 2/2023 | Deshpande |
| 2023/0125887 | A1 | 4/2023 | Habite et al. |
| 2023/0146259 | A1 | 5/2023 | Liktor et al. |
| 2023/0214684 | A1 | 7/2023 | Wang et al. |
| 2024/0273932 | A1* | 8/2024 | Tao ..................... G06V 10/764 |
| 2024/0281226 | A1* | 8/2024 | Zheng ..................... G06F 8/41 |
| 2024/0314197 | A1* | 9/2024 | Qu ..................... H04L 67/12 |

OTHER PUBLICATIONS

Notice of Allowance dated Jul. 25, 2023 issued in U.S. Appl. No. 18/297,530.

Notice of Allowance dated Aug. 2, 2023 issued in U.S. Appl. No. 18/297,545.

Office Action dated Aug. 3, 2023 issued in U.S. Appl. No. 18/297,339.

Office Action dated Jun. 12, 2023 issued in U.S. Appl. No. 18/297,376.

Notice of Allowance dated Aug. 30, 2023 issued in U.S. Appl. No. 18/297,376.

Office Action dated Jul. 11, 2023 issued in U.S. Appl. No. 18/297,389.

Notice of Allowance dated Aug. 19, 2023 issue in U.S. Appl. No. 18/297,389.

Office Action dated Jun. 20, 2023 in U.S. Appl. No. 18/297,424.

Notice of Allowance dated Aug. 2, 2023 in U.S. Appl. No. 18/297,424.

Notice of Allowanced dated Aug. 30, 2023 in U.S. Appl. No. 18/297,405.

Du et al, DP-PSI: Private and secure set intersection, Aug. 28, 2022, Cornel University, https://doi .org/10.48550/arXiv.2208.13249V1, p. 1-9. (Year: 2022).

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177.

Buddhavarapu et al., "Private matching for compute", Cryptology ePrint Archive, 2020, https://eprint.iacr.org/2020/599.

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, received Jan. 12, 2021, https://eprint.iacr.org/2021/034.

Pinkas et al., "SpOT-Light: Lightweight Private Set Intersection from Sparse OT Extension", Cryptology ePrint Archive, received Jun. 3, 2019, https://eprint.iacr.org/2019/634.

Chase et al., "Secret Shared Shuffle", Cryptology ePrint Archive, received Nov. 22, 2019, https://eprint.iacr.org/2019/1340.

Mohassel et al., " How to Hide Circuits in MPC: An Efficient Framework for Private Function Evaluation", Cryptology ePrint Archive, received Mar. 9, 2013, https://eprint.iacr.org/2013/137.

Garimella et al., "Private Set Operations from Oblivious Switching", Cryptology ePrint Archive, received Mar. 2, 2021, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology-EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

Kairouz et al., "The composition theorem for differential privacy." International conference on machine learning. PMLR, 2015. (Year: 2015).

Office Action dated Jun. 14, 2023 in U.S. Appl. No. 18/297,405.

Gopi S. et al., "Numerical Compostion of Differentail Privacy. Advances in Neural Information Processing Systems,"Nov. 10, 2021, vol. 34, pp. 11631-11642 [Retrieved on Jan. 9, 2025] DOI: None Section 1 Definition 1.4, Proposition 1.3, section 1.1, Section 2 Definition 2.3, section 4, section 5 Lemma 5.4, Theorem 5.5, Remark 5.6.

International Search Report and Written Opinion for Internaitional Application No. PCT/SG2024/050712 , mailed Jan. 13, 2025, 12 Pages.

Koskela A., et al., "Computing Differential Privacy Guarantees for Heterogeneous Compositions Using FFT," arXiv:2102.12412v2, Jun. 21, 2021 [Retrieved on Jan. 9, 2025] DOI: 10.48550/ARXIV.2102.12412 Section D.6 Lemma D.5.

Sommer D., et al., "Privacy Loss Classes: the Central Limit Theorem in Differential Privacy," Cryptology, Aug. 2020, 41 pages.

\* cited by examiner

TRANSFORMED PARTIAL CONVOLUTION ALGORITHM FOR COMPOSITION DETERMINATION

FIELD

The embodiments described herein pertain generally to differential privacy for secure computation and communication. More specifically, the embodiments described herein pertain to a transformed partial convolution algorithm for differential privacy composition determination for secure computation and communication.

BACKGROUND

Differential privacy (DP) protocols and algorithms have been used to provide robust data privacy protection. For each interactive query or operation from a user to a dataset, DP protocols and algorithms may provide a certain level of data privacy protection (e.g., referred to as a differential privacy guarantee). When multiple interactive queries occur, the overall data privacy protection level (e.g., referred to as a DP composition) may degrade. The determination of a DP composition is a critical subject in the area of privacy enhancement technologies. Techniques for such determinations may help answer how the overall data privacy protection level degrades under the composition of interactive queries when each query meets a certain level of data privacy protection. However, in some existing DP composition determination research, the DP composition upperbounds may be too loose (e.g., too big) to be practically implemented. Other existing DP composition determination research may quantify DP composition to numerically derive privacy loss by representing a privacy loss distribution directly, to reduce the computation complexity. However, such determination of DP composition may require periodicity and/or truncation of the privacy loss distribution, which may introduce errors that may be significant enough to render the numerical bound loose.

SUMMARY

Features in the embodiments disclosed herein may provide accurate determination of privacy loss in multiple interactive queries or operations to a dataset while satisfying a desired computation complexity. A numerical derivation of privacy loss for DP composition may be determined by a transformed partial convolution operation of a privacy loss distribution. Compared with other ways to reduce the computation complexity (e.g., via a Fast Fourier Transformation, which may compute the convolution of vectors in real time by casting them to the frequency domain and then applying multiplication, and may introduce computation errors during the transformation), features in the embodiments disclosed herein may provide an algorithm with a reduced computation complexity, without introducing computation errors. Compared with a non-transformed, full, convolution operation of a privacy loss distribution, features in the embodiments disclosed herein may provide an algorithm with a further reduced computation complexity.

Features in the embodiments disclosed herein may provide an efficient DP composition determination algorithm for discrete DP mechanisms without introducing computational error. In an example embodiment, given any noise distribution, query sensitivity, time of compositions, and/or target privacy budget, features in the embodiments disclosed herein may determine accurate privacy loss/leakage probability to guarantee a ($\epsilon$, $\delta$)-DP protection. Features in the embodiments disclosed herein may significantly reduce computational complexity by e.g., transforming the input privacy loss distribution.

In one example embodiment, a method for determining differential privacy composition in a secure communication is provided. The method includes determining a differential privacy configuration including a first privacy parameter and a second privacy parameter, determining a privacy loss distribution, and performing a partial convolution operation of the privacy loss distribution by transforming the privacy loss distribution based on a predetermined parameter, determining an integral range based on the first privacy parameter and the privacy loss distribution, transforming the privacy loss distribution based on the integral range, and performing the partial convolution operation based on the integral range. The method also includes determining the second privacy parameter based on a result of the partial convolution operation, and controlling a dataset based on the differential privacy configuration to limit access to the dataset.

In another example embodiment, a differential privacy composition determination system is provided. The system includes a processor and a memory to store a dataset. The processor is to determine a differential privacy configuration including a first privacy parameter and a second privacy parameter, determine a privacy loss distribution, perform a partial convolution operation of the privacy loss distribution by transforming the privacy loss distribution based on a predetermined parameter, determining an integral range based on the first privacy parameter and the privacy loss distribution, transforming the privacy loss distribution based on the integral range, and performing the partial convolution operation based on the integral range. The processor is also to determine the second privacy parameter based on a result of the partial convolution operation, and control a dataset based on the differential privacy configuration to limit access to the dataset.

In yet another example embodiment, a non-transitory computer-readable medium having computer-executable instructions stored thereon is provided. The instructions, upon execution, cause one or more processors to perform operations including determining a differential privacy configuration including a first privacy parameter and a second privacy parameter, determining a privacy loss distribution, and performing a partial convolution operation of the privacy loss distribution by transforming the privacy loss distribution based on a predetermined parameter, determining an integral range based on the first privacy parameter and the privacy loss distribution, transforming the privacy loss distribution based on the integral range, and performing the partial convolution operation based on the integral range. The operations also include determining the second privacy parameter based on a result of the partial convolution operation, and controlling a dataset based on the differential privacy configuration to limit access to the dataset.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
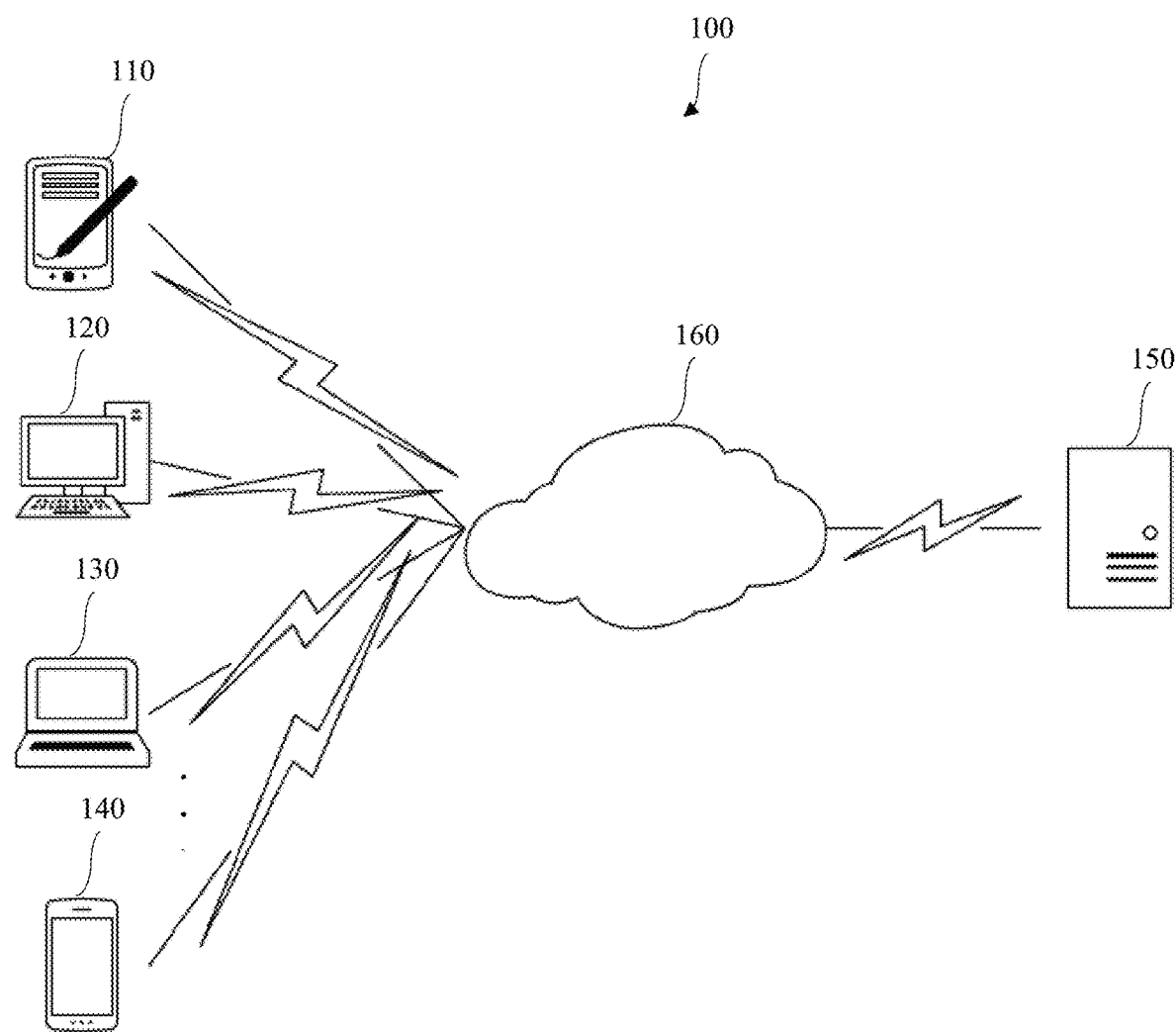
FIG. 1 is a schematic view of an example differential privacy composition determination system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hash" or "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, a "hash map" or "hash table" is a term of art and may refer to a data structure that represents an associative array or dictionary and uses hashing to store data. It is to be understood that a hash map may be used for storing data in key-value pairs for efficient retrieval and may be used for mapping keys to values. For example, a hash map may include a hash function to map an index into an array of data slots, from which the desired value may be found. During a lookup operation, the key may be hashed and the resulting hash may indicate the location where the corresponding value is stored in. That is, a value stored in a hash map may be retrieved using the key under which the value is stored.

As referenced herein, "differential privacy" or "DP" is a term of art and may refer to a standard, a protocol, a system, and/or an algorithm for publicly sharing information regarding a dataset by describing patterns of groups of elements within the dataset while withholding information about individual users listed in the dataset. It is to be understood that for differential privacy, when an amount of effect of making an arbitrary single substitution of a user's record in the dataset is smaller than a desired or predetermined threshold, a query result cannot be used to make inferences about any single individual user listed in the dataset, and therefore a corresponding DP algorithm may provide privacy protection. It is to also be understood that differential privacy may refer to a constraint on algorithms used to release aggregate information about a statistical dataset or database to a user, which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about individuals (e.g., the dataset includes records/rows of individuals). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

As referenced herein, a "randomized DP algorithm" or "randomized algorithm" is a term of art and may refer to an algorithm that employs a degree of randomness as part of its logic or procedure. It is to be understood that a randomized algorithm typically uses uniformly random bits as an auxiliary input to guide its behavior, thus achieving desired performance over all possible random choices determined by the random bits; as non-limiting examples, one or both of the running time and the output are random variables.

As referenced herein, "privacy loss distribution" or "PLD" is a term of art and may refer to a probability distribution of the privacy loss of a mechanism (e.g., the randomized algorithm, etc.) in the context of differential privacy (DP). As referenced herein, "privacy loss" may refer to a representation of the privacy leakage or a quantifiable measure of harm to a dataset incurred by e.g., an individual record of the dataset.

As referenced herein, "differential privacy composition" or "DP composition" is a term of art and may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation to the dataset has a privacy loss L, the cumulative impact of N queries (referred to as N-fold composition or N-fold DP composition) on data privacy may be greater than L but may be lower than L*N. In an example embodiment, an N-fold DP composition may be determined based on an N-fold convolution (or an N-fold transformed partial convolution) operation of the privacy loss distribution. For example, a DP composition of two queries may be determined based on a convolution (or transformed partial convolution) of the privacy loss distribution of the two queries. In an example embodiment, a composition may be sequential composition (e.g., multiple separate queries are performed on a single dataset).

As referenced herein, a "convolution", a "full convolution", or a "two-fold convolution" is a term of art and may refer to an operation on two functions (e.g., f and g) that produces a third function (f ⊛ g) that expresses how the shape of one function is modified by the other. See the descriptions of FIGS. 5A-5F for an example of a convolution operation. It is to be understood that the convolution may refer to the result function and/or to the process of computing the function. In an example embodiment, the convolution may be defined as the integral of the product of the two functions after one function is reflected about the y-axis and shifted. It is to be understood that the choice of which function is reflected and shifted before the integral does not change the integral result (i.e., the operation has commutativity). The integral is evaluated for all values of the shifted, producing the convolution function. It is to be understood that when f and g are the same function, the convolution (or a two-fold convolution) may be represented as $f \circledast^2$. An N-fold convolution operation on the function f may be represented as $f \circledast^N$.

As referenced herein, a "partial convolution" or a "two-fold partial convolution" may refer to a convolution operation on two functions (e.g., f and g) that produces a third function (f ⊛ g), where a portion of data instead of the full set of data from the function f and/or a portion of data instead of the full set of data from the function g are used or involved in the convolution operation. See the descriptions of FIGS. 6A-6F for an example of a partial convolution operation. It is to be understood that when f and g are the same function, the partial convolution (or the two-fold partial convolution) may be represented as $f \circledast^2$. An N-fold partial convolution operation on the function f may be represented as $f \circledast^N$.

As referenced herein, "translate", "translating", or "translation" in Euclidean geometry is a term of art and may refer to an action of a geometric transformation that moves every point of a figure, shape, or space by a same distance in a given direction. It is to be understood that a translation may also be interpreted as the addition of a constant vector to every point, or as shifting the origin of the coordinate system. In a Euclidean space, any translation is an isometry (i.e., a distance-preserving transformation between metric spaces).

As referenced herein, "reflect", "reflecting", or "reflection" is a term of art and may refer to a mapping from a Euclidean space to itself that is an isometry with a hyperplane as a set of fixed points, where the set is called the axis (in two dimensions) or plane (in three dimensions) of reflection. It is to be understood that the image of a figure by a reflection is its mirror image in the axis or plane of reflection. That is, a reflection is a type of geometrical transformation, where an object is flipped to create a mirror or congruent image.

As referenced herein, a "support" of a real-valued function in mathematics is a term of art and may refer to a subset of the function domain containing the elements which are not mapped to zero.

FIG. 1 is a schematic view of an example differential privacy composition determination system 100, arranged in accordance with at least some embodiments described herein.

The system 100 may include terminal devices 110, 120, 130, and 140, a network 160, and a server 150. It is to be understood that the server 150 may be a server of a trusted data owner (or holder or curator, such as a social media platform, a website, a service provider, an application, etc.) that contains or stores a dataset to be queried (or operated, e.g., analyzed, processed, used, stored, shared, accessed, etc.). The terminal devices 110, 120, 130, and 140 may be the device(s) used to query (or operate, e.g., analyze, process, use, store, share, access, etc.) the dataset on or from the server. It is also to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping applications, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may optionally include the network 160 while including the terminal device 110, 120, 130, and 140, or the server 150.

It is further to be understood that the terminal device 110, 120, 130, and 140 and the server 150 may each include one or more processors, a memory, and a storage device storing one or more programs. Each of the terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
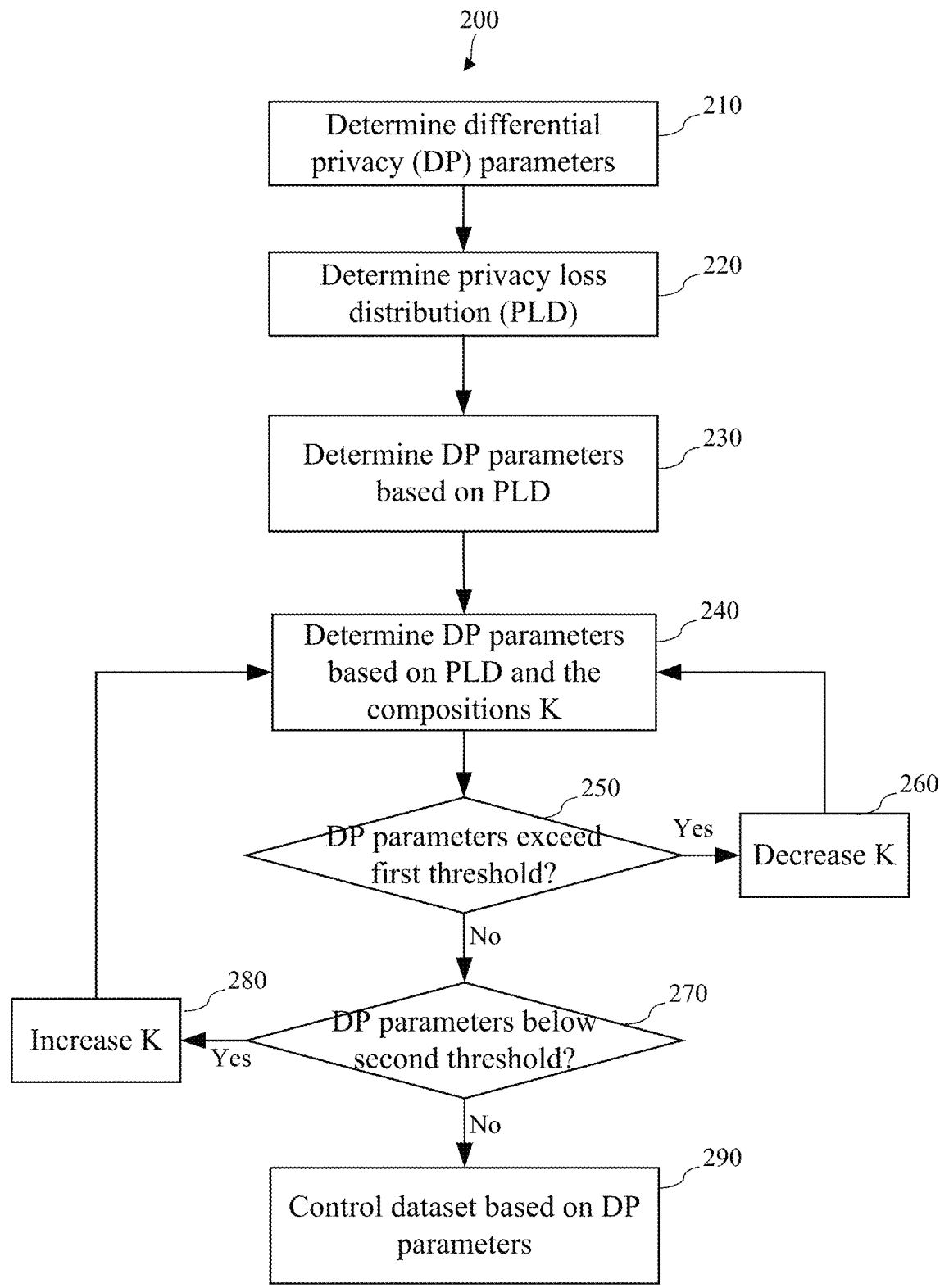
FIG. 2 is a flow chart illustrating an example processing flow for a differential privacy composition determination algorithm, in accordance with at least some embodiments described herein.

FIG. 2 is a flow chart illustrating an example processing flow 200 for a differential privacy composition determination algorithm, in accordance with at least some embodiments described herein.

Figure 7:
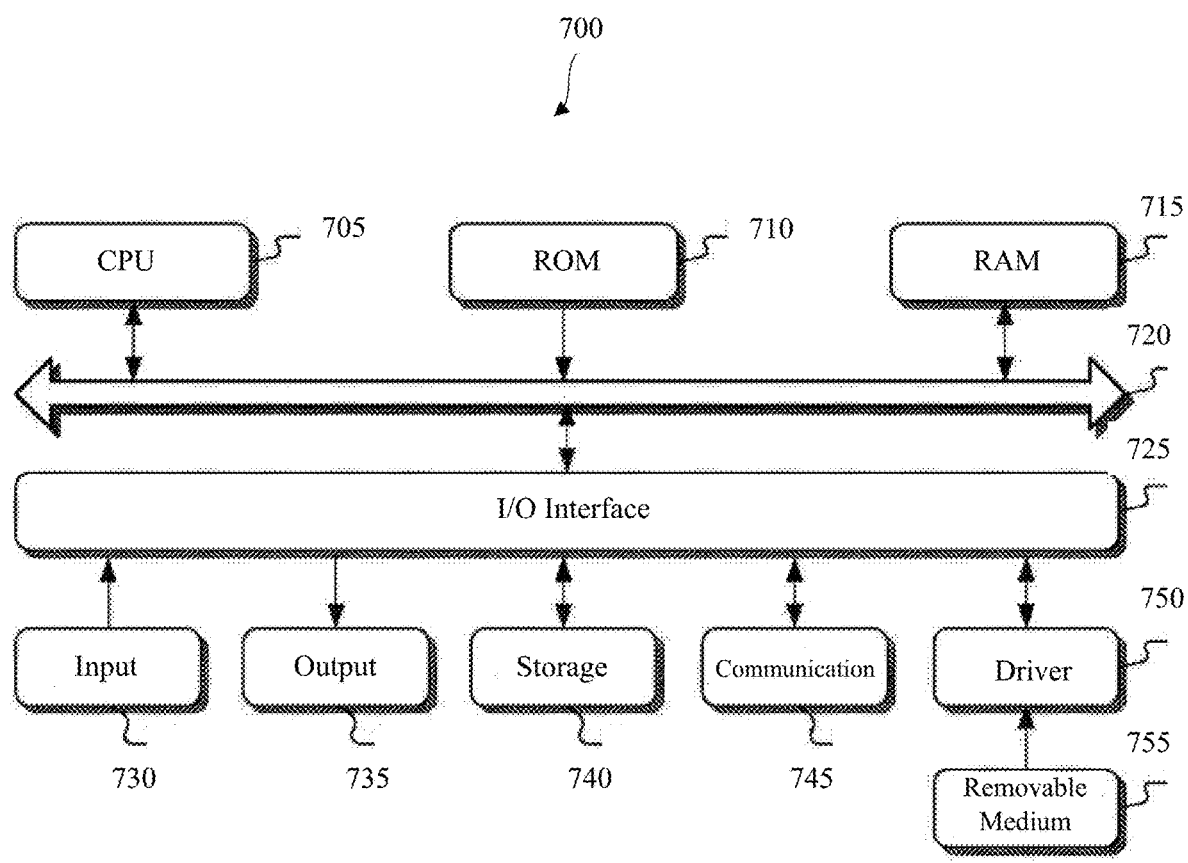
FIG. 7 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified.

It is also to be understood that the processing flow 200 can include one or more operations, actions, or functions as illustrated by one or more of blocks 210, 220, 230, 240, 250, 260, 270, 280, and 290. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 200 may begin at block 210.

At block 210 (Determine differential privacy (DP) parameters), the processor may determine or provide a set of differential privacy parameters. In an example embodiment, a trusted data owner (or data holder, data curator, etc.) has a dataset of sensitive information about individuals for whom data is included in the dataset (i.e., the dataset includes records/rows of the individuals). Each time the dataset is queried (or operated, e.g., analyzed, processed, used, stored, shared, accessed, etc.), there may be a chance or possibility of data privacy being compromised (e.g., probability of data privacy leakage or another form of privacy loss). For a differential privacy protocol or algorithm, an operation (e.g., a single operation) to the dataset such as an intersection, an inner join, a query, an analysis, an access, or other suitable operations may guarantee being ($\epsilon$, $\delta$)-differentially private (described and/or defined below) for the dataset. It is also to be understood that in an example embodiment, "$\epsilon$" may refer to a first privacy parameter, and "δ" may refer to a second privacy parameter. In an example embodiment, ϵ and/or δ may be predetermined to achieve a desired data privacy protection goal or performance.

In a differential privacy protocol or algorithm, it is to be understood that a privacy-protection mechanism M (e.g., a randomized algorithm, etc.) used in the differential privacy protocol or algorithm may use an input dataset A (e.g., a dataset having an individual record I) and a neighboring input dataset A' (e.g., a dataset without the individual record I) that differs from A by one element (e.g., the individual record I, and thus A' has one entry less than A) or more elements. The privacy-protection mechanism M may map the input dataset(s) to a real value in an R domain. The privacy-protection mechanism M is deemed to be "(ϵ, δ)-differentially private" (i.e., differentially private based on the ϵ and δ) if, for any pair of (A, A') and every measurable set $\bigcirc \in \bigcirc$ or ∈ Range(M), the probability of (M(A)=$\bigcirc$) is less than or equal to $e^\epsilon \times$ the probability of (M(A')=$\bigcirc$)+δ, where e is the Euler's number. Such definition of being (ϵ, δ)-differentially private may be represented as $Pr(\mathcal{M}(A)=o) \leq e^\epsilon Pr(\mathcal{M}(A')=o)+\delta$, where Pr(.) is the probability function. That is, being (ϵ, δ)-differentially private may indicate that any event when the individual record I is considered, may have occurred with roughly the same probability (within the range or tolerance defined by ϵ and δ) of data privacy leakage even if the individual record I was never considered. Being (ϵ, δ)-differentially private by definition may guarantee that the individual I's participation in the query or operation of the dataset may not lead to significant harm or privacy loss to the dataset.

It is to be understood that the above requirement of the differential privacy protocol or algorithm may refer to a measure of "how much data privacy is afforded (e.g., by a single query or operation on the input dataset) when performing the operations or functions?" The measurable set E may refer to all potential output of M that may be predicted. The first privacy parameter "ϵ" may refer to a privacy budget (i.e., a limit of how much data privacy it is acceptable with leaking), e.g., indicating a maximum distance between a query or operation on dataset A and the same query or operation on dataset A'. The smaller the value of e is, the stronger the privacy protection is (e.g., for the multi-identification privacy-protection mechanism). The bigger the value of ϵ is, the weaker the privacy protection is. The second privacy parameter "δ" may refer to a probability, such as a probability of information being accidentally leaked. In an example embodiment, a required or predetermined numeric value of ϵ may range from at or about 1 to at or about 3. The required or predetermined numeric value of δ may range from at or about $10^{-10}$ (or at about $10^{-8}$) to at or about $10^{-6}$. It is to be understood that the bigger the value of ϵ is, the smaller the value of δ is, and that the smaller the value of ϵ is, the bigger the value of δ is.

It is also to be understood that the privacy-protection mechanism M may achieve, meet, satisfy, or guarantee the requirement to be (ϵ, δ)-differentially private with any pair of (A, A') when δ(ϵ)=max ($\delta_{AA'}(\epsilon)$, $\delta_{A'A}(\epsilon)$), for which δ may be defined as a function of ϵ, $\delta_{AA'}(\epsilon)$ may be defined as $$\sum_{o \in O} \max(Pr(\mathcal{M}(A)=o) - e^\epsilon Pr(\mathcal{M}(A')=o), 0),$$

and $\delta_{A'A}(\epsilon)$ may be defined as $$\sum_{o \in O} \max(Pr(\mathcal{M}(A')=o) - e^\epsilon Pr(\mathcal{M}(A)=o), 0).$$

It is to be understood that A, A' are neighboring datasets, and $\delta_{AA'}(\epsilon)$ may be different from $\delta_{A'A}(\epsilon)$ based on the sequence or ordering of A and A'. Since being (ϵ, δ)-differentially private may need to consider the worst case scenario, the maximum of $\delta_{AA'}(\epsilon)$ and $\delta_{A'A}(\epsilon)$ may be used to define the privacy-protection for the neighboring datasets A and A'.

In an example embodiment, $\delta_{AA'}$ may be represented by the following:

$$\delta_{AA'} = \sum_{o \in O} \max(Pr(\mathcal{M}(A)=o) - e^\epsilon Pr(\mathcal{M}(A')=o), 0)$$

$$= \sum_{\frac{Pr(\mathcal{M}(A)=o)}{Pr(\mathcal{M}(A')=o)} > e^\epsilon} (Pr(\mathcal{M}(A)=o) - e^\epsilon Pr(\mathcal{M}(A')=o)$$

$$= \sum_{\frac{Pr(\mathcal{M}(A)=o)}{Pr(\mathcal{M}(A')=o)} > e^\epsilon} \left(1 - e^\epsilon \frac{Pr(\mathcal{M}(A')=o)}{Pr(\mathcal{M}(A)=o)}\right) Pr(\mathcal{M}(A)=o)$$

In an example embodiment, $\delta_{A'A}$ may be represented similar to $\delta_{AA'}$ (with A and A' being exchanged). Processing may proceed from block 210 to block 220.

At block 220 (Determine privacy loss distribution (PLD)), the processor may determine or provide the privacy loss distribution (PLD) of the query or operation (e.g., a single query or operation) of the dataset or dataset pair of (A, A'). In an example embodiment, the PLD may be predefined or predetermined. For example, the PLD may be represented as $$Pr\left(\Gamma = \ln\left(\frac{Pr(\mathcal{M}(A)=o)}{Pr(\mathcal{M}(A')=o)}\right)\right) = Pr(\mathcal{M}(A)=o),$$

where Pr(.) is a probability function, and Γ is the privacy loss/leakage of the system (e.g., a value representing a quantity of the privacy leakage or loss). It will be appreciated that the maximum positive value of the Γ may be referred to as "$L_{max}$", and the maximum negative value of the Γ may be referred to as "$-L_{max}$". Processing may proceed from block 220 to block 230.

At block 230 (Determine DP parameters based on PLD), the processor may determine or represent the DP parameters (e.g., the $\delta_{AA'}$ and $\delta_{A'A}$ as functions of ϵ) that are determined at block 210 based on the PLD defined or determined at block 220. In an example embodiment, the DP parameters at block 210 may be determined or defined as a function of the PLD of block 220. For example, the DP parameters at block 210 may be represented by the following:

$$\delta_{AA'} = \sum_{\gamma: \gamma > \epsilon} (1 - e^{\epsilon-\gamma}) P_\Gamma(\gamma) \stackrel{\Delta}{=} Pr(\gamma = \infty) + \sum_{\gamma: \epsilon < \gamma < \infty} (1 - e^{\epsilon-\gamma}) P_\Gamma(\gamma),$$

for which $P_\Gamma(\gamma)$ is the PLD. It is to be understood that the DP parameters determined at block 210 and/or the PLD determined at block 220 may refer to the DP parameters and the PLD for a single query or operation to the dataset (or to the dataset pair A, A', etc.). Processing may proceed from block 230 to block 240.

At block 240 (Determine DP parameters based on PLD and the compositions K), the processor may determine the DP parameters for multiple queries or operations (e.g., K queries, K operations, K compositions, K composition operations, K-fold composition, etc.) based on the PLD determined at block 220 and an input number K. It is to be understood that the input K may be a predetermined or estimated tentative number.

It is to be understood that the DP parameters for the K-fold composition (or K compositions, K composition operations, etc.) $\delta_{A'A}(\epsilon, K)$ may be represented by the following:

$$1 - (1 - Pr(\gamma = \infty))^K + \sum_{\gamma: \epsilon < \gamma < \infty} (1 - e^{\epsilon - \gamma}) P_\Gamma(\gamma) \circledast K.$$

The DP parameters for the K-fold composition $\delta_{AA'}(\epsilon, K)$ may represented similar to $\delta_{A'A}(\epsilon, K)$ (e.g., with A and A' being exchanged). It is to be understood that $Pr(\gamma=\infty)$ is a constant number that may be determined or defined by the privacy-preserving or privacy-protection mechanism M. As such, the DP parameters $(\epsilon', \delta')$ for the K-fold composition may be determined once the $P_\Gamma(\gamma) \circledast K$ is determined (see the description of FIG. 4). It is to be understood that $\epsilon'$ may refer to a third privacy parameter, and $\delta'$ may refer to a fourth privacy parameter.

It is also to be understood that $P_\Gamma(\gamma) \circledast K$, which is a K-fold convolution (or partial convolution) of $P_\Gamma(\gamma)$ (e.g., $P_\Gamma(\gamma) \circledast P_\Gamma(\gamma) \ldots \circledast P_\Gamma(\gamma)$, where $P_\Gamma(\gamma)$ appears K times in the convolution (or partial convolution) operations) may represent the PLD of the privacy-protection mechanism M after the K-fold composition. See descriptions of FIGS. 3 and 4 for detailed description about how to determine $P_\Gamma(\gamma) \circledast K$. Processing may proceed from block 240 to block 250.

At block 250 (DP parameters exceed first threshold?), the processor may compare the DP parameters $(\epsilon', \delta')$ for the K-fold composition determined at block 240 with predetermined first thresholds. If one or more of the DP parameters $(\epsilon', \delta')$ for the K-fold composition exceed a corresponding predetermined first threshold (e.g., $\epsilon'$ exceeds a predetermined first threshold for the privacy budget, $\delta'$ exceeds a predetermined first threshold for the probability of data privacy leakage, etc.), processing may proceed from block 250 to block 260. If none of the DP parameters $(\epsilon', \delta')$ for the K-fold composition exceeds the corresponding first predetermined threshold (e.g., $\epsilon'$ is at or below the predetermined first threshold for the privacy budget, and $\delta'$ is at or below the predetermined first threshold for the probability of data privacy leakage, etc.), processing may proceed from block 250 to block 270.

At block 260 (Decrease K), the processor may decrease the number K and processing may proceed from block 260 back to block 240, where the processor may use the decreased number K as the new input K to determine the DP parameters $(\epsilon', \delta')$ for the new K-fold composition.

At block 270 (DP parameters below second threshold?), the processor may compare the DP parameters $(\epsilon', \delta')$ for the K-fold composition determined at block 240 with predetermined second thresholds. If one or more of the DP parameters $(\epsilon', \delta')$ for the K-fold composition are below a corresponding predetermined second threshold (e.g., $\epsilon'$ is below a predetermined second threshold for the privacy budget, $\delta'$ is below a predetermined second threshold for the probability of data privacy leakage, etc.), processing may proceed from block 270 to block 280. If none of the DP parameters $(\epsilon', \delta')$ for the K-fold composition is below the corresponding second predetermined threshold (e.g., $\epsilon'$ is at or above the predetermined second threshold for the privacy budget, $\delta'$ is at or above the predetermined second threshold for the probability of data privacy leakage, etc.), processing may proceed from block 270 to block 290.

At block 280 (Increase K), the processor may increase the number K and processing may proceed from block 280 back to block 240, where the processor may use the increased number K as the new input K to determine the DP parameters $(\epsilon', \delta')$ for the new K-fold composition.

It is to be understood that the corresponding predetermined first thresholds for $(\epsilon', \delta')$ may be greater than the corresponding predetermined second thresholds for $(\epsilon', \delta')$, respectively. It is also to be understood at block 250, it is determined that the number K is too big such that the DP parameters $(\epsilon', \delta')$ for the K-fold composition exceeds a desired corresponding first value or threshold, K needs to be decreases so that the new DP parameters $(\epsilon', \delta')$ for the decreased K-fold composition may be within the desired range (e.g., below the desired corresponding first threshold). At block 270, it is determined that the number K is too small such that the DP parameters $(\epsilon', \delta')$ for the K-fold composition is well below a desired corresponding second value or threshold, K needs to be increased so that the user of the dataset may perform more queries or operations on the dataset while the new DP parameters $(\epsilon', \delta')$ for the increased K-fold composition may be still within the desired range (e.g., below the desired corresponding first threshold).

It is also to be understood that the sequence or order of the processes in block 250 and in block 270 may be exchanged. That is, the processes in block 270 may be performed before the processes in block 250, and processing may proceed from block 250 (instead of block 270) to block 290.

At block 290 (Control dataset based on DP parameters), the processor may control or configure the dataset (to be queries or operated) based on e.g., the DP parameters $(\epsilon', \delta')$ for the K-fold composition and/or the number K. For example, for each Internet Protocol (IP) address, the processor may limit the number of queries or operations (from that IP address) on the dataset to the number K every predetermined period of time (e.g., every day, etc.). It is to be understood that the predetermined period of time may be determined based on e.g., a frequency of updating the dataset so that the updated dataset is not neighboring with the previous dataset (before being updated) anymore. It is to be understood that by limiting the number of queries or operations (from one IP address) on the dataset to the number K every predetermined period of time, the overall operations to the dataset may be deemed as being $(\epsilon', \delta')$-differentially private.

Figure 3:
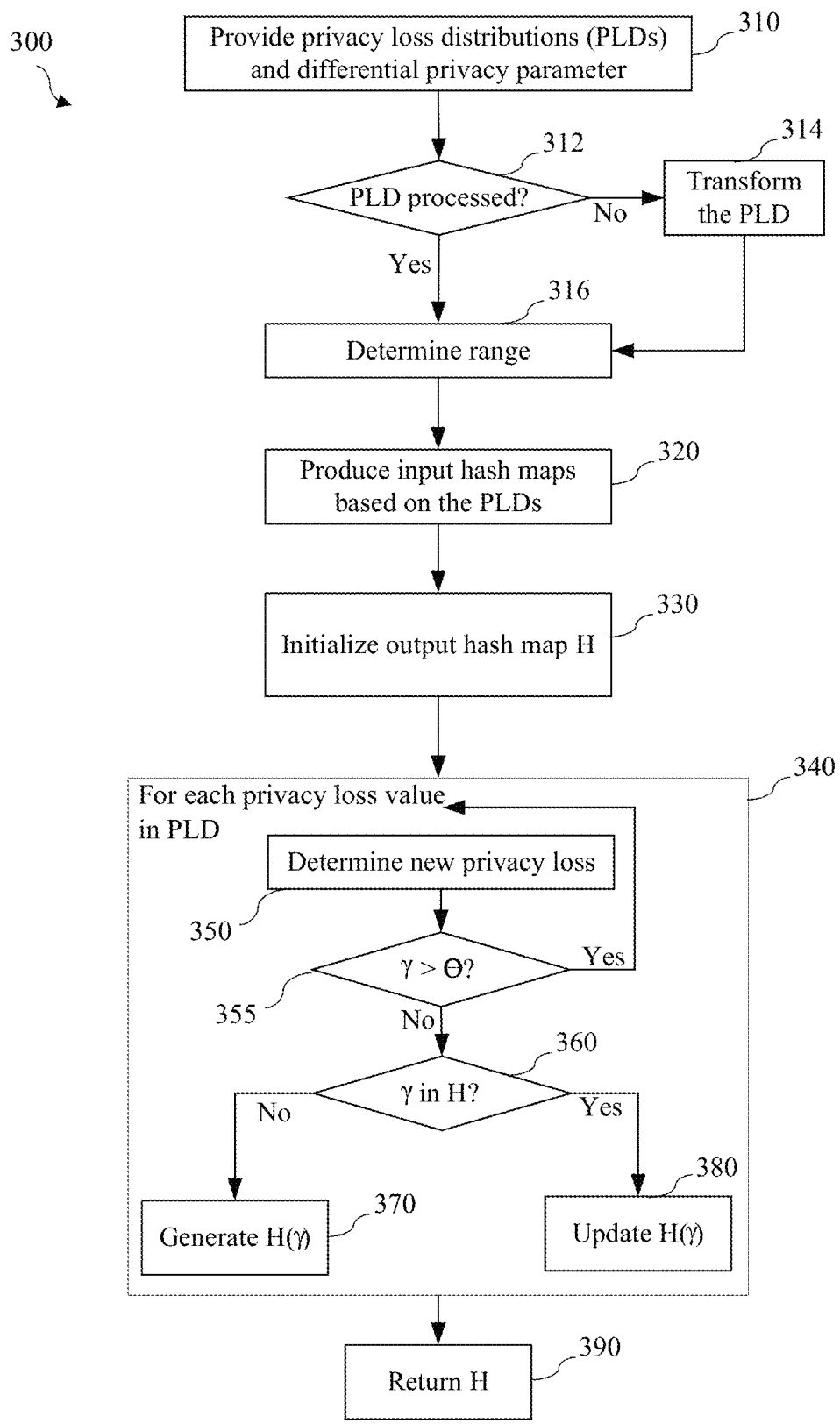
FIG. 3 is a flow chart illustrating an example processing flow for a transformed partial convolution algorithm, in accordance with at least some embodiments described herein.

FIG. 3 is a flow chart illustrating an example processing flow 300 for a transformed partial convolution algorithm, in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified.

It is also to be understood that the processing flow 300 can include one or more operations, actions, or functions as illustrated by one or more of blocks 310, 312, 314, 316, 320, 330, 340, 350, 355, 360, 370, 380, and 390. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation.

It is further to be understood that the transformed partial convolution algorithm in the processing flow 300 may refer to algorithm A1. The inputs to algorithm A1 include a first privacy loss distribution (PLD) and a second PLD (see description of block 310). The inputs to algorithm A1 also include a parameter (e.g., the privacy budget $\epsilon$) of a DP configuration, and/or the times or the number (K) of the DP composition. In an example embodiment, K=2. In another example embodiment, K>2. The output of algorithm A1 includes a result (see description of block 390) of a transformed partial convolution operation on the first PLD and the second PLD. Processing flow 300 may begin at block 310.

At block 310 (Provide privacy loss distributions (PLDs) and differential privacy parameter), the processor may provide, obtain, or receive a first PLD $P_\Gamma^1(\gamma)$ and a second PLD $P_\Gamma^2(\gamma)$. The processor may also provide, obtain, or receive the privacy budget $\epsilon$ and/or the times or the number K of the DP composition. It is to be understood that the first PLD and the second PLD (and/or the $\epsilon$ and/or the K) are inputs to algorithm A1, and the output of algorithm A1 is a result of the transformed partial convolution operation on the first PLD and the second PLD ($P_\Gamma^1(\gamma) \circledast P_\Gamma^2(\gamma)$). In an embodiment, one or more of the first PLD and the second PLD include sparse vectors. It is to be understood that a sparse vector may refer to a vector that contains mostly zeros, with only a few non-zero elements. A sparse vector is a useful data structure for representing data that is mostly empty or has a lot of zeros. In an embodiment, the first PLD and the second PLD may be the same ($P_\Gamma(\gamma)$), and the result of the transformed partial convolution operation on the first PLD and the second PLD may be represented as $P_\Gamma(\gamma) \circledast^2$. Processing may proceed from block 310 to block 312.

At block 312 (PLD processed), the processor may determine whether the first PLD $P_\Gamma^1(\gamma)$ and/or the second PLD $P_\Gamma^2(\gamma)$ are pre-processed (e.g., transformed). If the first PLD $P_\Gamma^1(\gamma)$ and/or the second PLD $P_\Gamma^2(\gamma)$ are pre-processed, processing may proceed from block 312 to block 316. If the first PLD $P_\Gamma^1(\gamma)$ and/or the second PLD $P_\Gamma^2(\gamma)$ are not pre-processed, processing may proceed from block 312 to block 314.

At block 314 (Transform the PLD), the processor may pre-process (e.g., transform, such as translate, reflect, etc.) the first PLD $P_\Gamma^1(\gamma)$ and/or the second PLD $P_\Gamma^2(\gamma)$. In an example embodiment, the processor may translate (e.g., shift along the X coordinate) the first PLD $P_\Gamma^1(\gamma)$ and/or the second PLD $P_\Gamma^2(\gamma)$ to the left by a predetermined value (e.g., maximum value of $\gamma$ (max $\gamma$)). That is, $P_\Gamma^k(\gamma)$ is set to $P_\Gamma^k(\gamma+\max \gamma)$ for any $K \in \{1, 2\}$. See e.g., FIGS. 6A and 6B for detailed description of the translation operation. In an example embodiment, the processor may reflect the translated first PLD $P_\Gamma^1(\gamma)$ and/or the translated second PLD $P_\Gamma^2(\gamma)$ about the axis $\gamma=0$. That is, $P_\Gamma^k(\gamma)$ is set to $P_\Gamma^k(-\gamma)$ for any $K \in \{1, 2\}$. See e.g., FIGS. 6B and 6C for detailed description of the reflection operation. It is to be understood that the reflection operation may be optional. See e.g., FIGS. 6D and 6F for detailed descriptions. Processing may proceed from block 314 to block 316.

At block 316 (Determine range), the processor may determine a range (e.g., an integral range) for e.g., the partial convolution operation. In an example embodiment, the range $\theta$ may be set as max $\gamma 1$ (e.g., the maximum value of $\gamma$ for the first PLD $P_\Gamma^1(\gamma)$)+max $\gamma 2$ (e.g., the maximum value of $\gamma$ for the second PLD $P_\Gamma^2(\gamma)$)− the privacy budget $\epsilon$. See e.g., FIGS. 5F and 6D for detailed description of determining the range. It is to be understood that in an embodiment, the blocks 312, 314, and/or 316 may be optional. Processing may proceed from block 316 to block 320.

At block 320 (Produce input hash maps based on the PLDs), the processor may produce a first hash map $H_\Gamma^1(\gamma)$ for the first PLD $P_\Gamma^1(\gamma)$ and store the information of the first PLD $P_\Gamma^1(\gamma)$ as the first hash map $H_\Gamma^1(\gamma)$ such that each key-value pair of the first hash map represents each pair of the privacy leakage value and its corresponding probability of data privacy leakage in the first PLD, respectively. The processor may produce a second hash map $H_\Gamma^2(\gamma)$ for the second PLD $P_\Gamma^2(\gamma)$ and store the information of the second PLD $P_\Gamma^2(\gamma)$ as the second hash map $H_\Gamma^2(\gamma)$ such that each key-value pair of the second hash map represents each pair of the privacy leakage and its corresponding probability of data privacy leakage in the second PLD, respectively.

For example, the PLD $P_\Gamma^1(\gamma)$ may have a first value (privacy leakage value) 1, with corresponding probability (of privacy leakage) value 0.5; a second value (privacy leakage value) 2, with corresponding probability (of privacy leakage) value 0.3; and a third value (privacy leakage value) 3, with corresponding probability (of privacy leakage) value 0.2. The first hash map $H_\Gamma^1(\gamma)$ may have a first key-value pair (1, 0.5) where 1 is the key and 0.5 is the value ($H_\Gamma^1(1)=0.5$), a second key-value pair (2, 0.3) where 2 is the key and 0.3 is the value ($H_\Gamma^1(2)=0.3$), and a third key-value pair (3, 0.2) where 3 is the key and 0.2 is the value ($H_\Gamma^1(3)=0.2$).

It is to be understood that when producing the first hash map $H_\Gamma^1(\gamma)$ and/or the second hash map $H_\Gamma^2(\gamma)$, if $\gamma > \theta$, the processor may drop (e.g., skip, not create/generate the key-value pair; e.g., truncate the PLD; etc.). That is, only when $\gamma$ is within the range ($\gamma <= \theta$), the key-value pair may be generated so that a partial convolution (instead of a full convolution) may be performed e.g., at the following blocks. See e.g., FIGS. 5F and 6C-6E for detailed description of truncating the PLD and of a partial convolution operation. Processing may proceed from block 320 to block 330.

At block 330 (Initiate output hash map H), the processor may produce and initiate a hash map $H_\Gamma^r(\gamma)$ as a new hash map. It is to be understood that the hash map $H_\Gamma^r(\gamma)$ may be configured to store the result of the transformed partial convolution operation on the first PLD and the second PLD. Processing may proceed from block 330 to block 340. It is also to be understood that block 340 includes blocks 350, 355, 360, 370, and 380.

At block 340 (For each privacy loss value in PLD), the processor may perform the processes in blocks 350, 360, 370, and/or 380 for each privacy leakage value in the first PLD and the second PLD (e.g., for $key_i \in Range(P_\Gamma^1(\gamma))$ or $Range(H_\Gamma^1(\gamma))$, $key_j \in Range(P_\Gamma^2(\gamma))$ or $Range(H(\gamma))$).

At block 350 (Determine new privacy loss $\gamma$), the processor may determine a new privacy leakage value of the result of the transformed partial convolution operation (of the first PLD and the second PLD). For example, the new privacy leakage value may be $\gamma$, which may be determined by the privacy leakage values in the first PLD and the second PLD (e.g., $\gamma = key_i + key_j$). Processing may proceed from block 350 to block 355.

At block 355 ($\gamma>\theta$?), the processor may determine or check whether the new privacy leakage value $\gamma$ is greater than the range $\theta$. If $\gamma$ is greater than the range $\theta$, the processor may end the current iteration of the processes of the block 340 (i.e., skip the processes in blocks 360, 370, and/or 380), and start the next iteration of the processes of the block 340 (e.g., from block 350, with next privacy loss value in the PLD). If $\gamma$ is not greater than the range $\theta$, processing may proceed from block 355 to block 360.

At block 360 ($\gamma$ in H?), the processor may determine or check whether the new privacy leakage value $\gamma$ is an existing key in the output hash map $H_\Gamma^r$. When $\gamma$ is an existing key in $H_\Gamma^r$, processing may proceed from block 360 to block 380. When $\gamma$ is not an existing key in $H_\Gamma^r$, processing may proceed from block 360 to block 370.

At block 370 (Generate H($\gamma$)), the processor may generate a key-value pair in $H_\Gamma^r$ using the new privacy leakage value $\gamma$ as the key. The corresponding value of the key-value pair may be a production (multiplication) of the corresponding possibilities in the first PLD and the second PLD. For example, the corresponding value of the key-value pair may be represented as $H_\Gamma^r(\gamma)=H_\Gamma^1(key_i)*H_\Gamma^2(key_j)$.

At block 380 (Update H($\gamma$)), the processor may update the key-value pair in $H_\Gamma^r$ where the key is the new privacy leakage value $\gamma$. The corresponding value of the key-value pair may be a production (multiplication) of the corresponding possibilities in the first PLD and the second PLD plus the existing/previous value in the key-value pair. For example, the corresponding value of the key-value pair may be represented as $H_\Gamma^r(\gamma)=H_\Gamma^r(\gamma)+H_\Gamma^1(key_i)*H_\Gamma^2(key_j)$.

The processes of blocks 350, 355, 360, 370, and/or 380 may be repeated until each privacy leakage value in the first PLD and the second PLD (e.g., for $key_i \in Range(H_\Gamma^1(\gamma))$, $key_j \in Range(H_\Gamma^2(\gamma))$) is processed. Processing may proceed from block 340 to block 390.

At block 390 (Return H), the processor may return the output hash map $H_\Gamma^r$ as a result of the transformed partial convolution operation of the first PLD and the second PLD. It is to be understood that the result $H_\Gamma^r$ is also the output of algorithm A1.

It is to be understood that algorithm A1 may be configured to determine one time transformed partial convolution of the first and second PLDs by first casting the privacy probability distribution into a hash map, where the key-value pair represents the pair of privacy leakage value and the probability of data privacy leakage in the PLDs. Then the algorithm A1 may loop over each possible combined privacy leakage value and update the corresponding probability of combined data privacy leakage.

It is to be understood that the features described in the embodiments disclosed herein may reduce the integral range/interval/section (see description of FIG. 5F) from [$-k*L_{max}$, $k*L_{max}$] (for a full convolution) to [$\epsilon$, $k*L_{max}$] (for a partial convolution), and the ratio of the range is thus $(k*L_{max}-\epsilon)/(k*L_{max})$. Such reduction may be hold for all K convolution operations; and thus the computation complexity of the algorithm A1 (partial convolution) described herein compared to the full convolution algorithm (e.g., integral the whole support of the PLD) may be $[(k*L_{max}-\epsilon)/(k*L_{max})]^k$.

Figure 4:
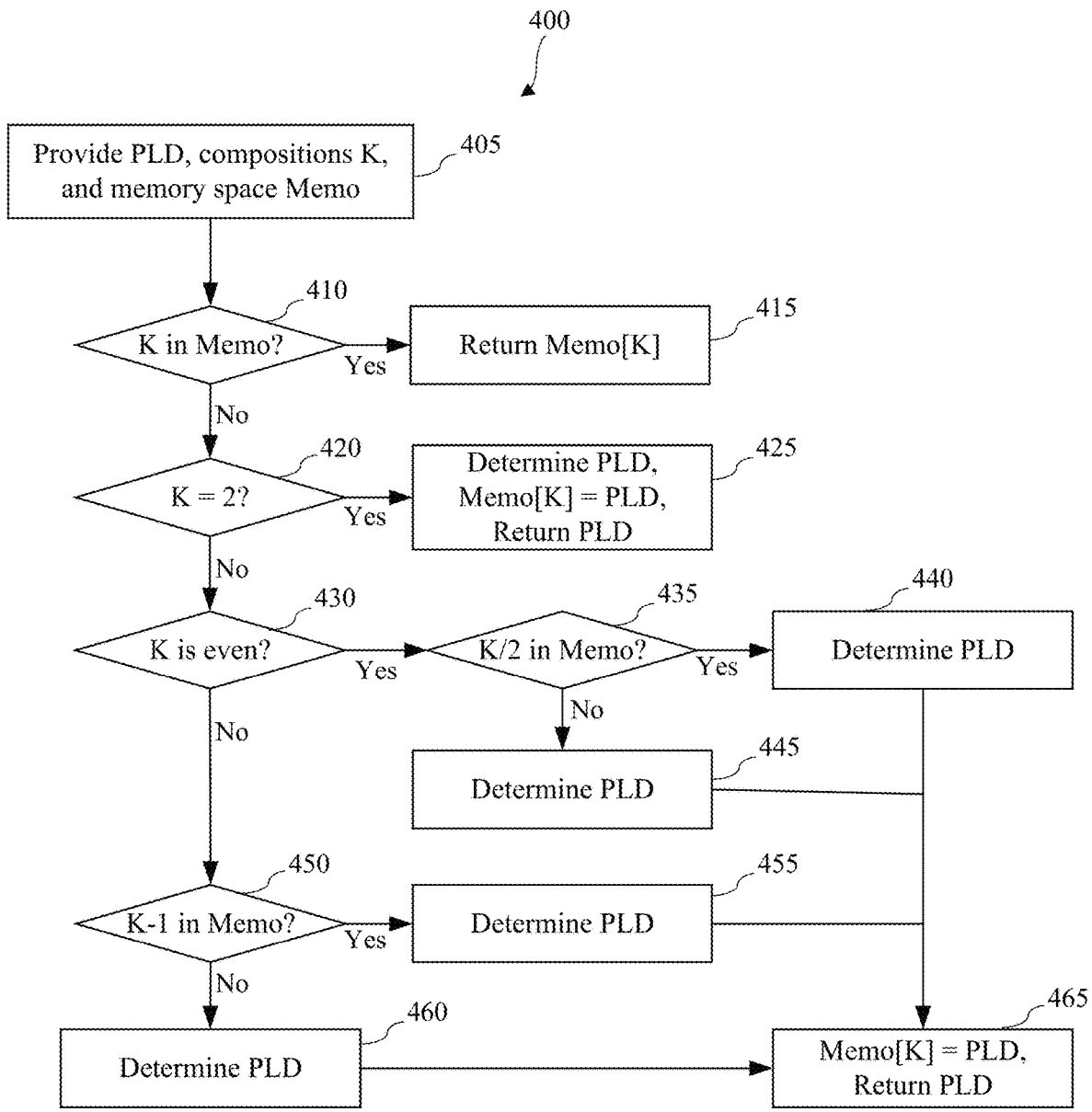
FIG. 4 is a flow chart illustrating an example processing flow for a K-fold transformed partial convolution algorithm, in accordance with at least some embodiments described herein.

FIG. 4 is a flow chart illustrating an example processing flow 400 for a K-fold transformed partial convolution algorithm, in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified.

It is also to be understood that the processing flow 400 can include one or more operations, actions, or functions as illustrated by one or more of blocks 405, 410, 415, 420, 425, 430, 435, 440, 445, 450, 455, 460, and 465. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation.

It is further to be understood that the K-fold transformed partial convolution algorithm in the processing flow 400 may refer to algorithm A2. The inputs to algorithm A2 include the privacy loss distribution (PLD, e.g., a partial PLD of FIG. D), the number (K) of composition operations, and a memory space Memo. The output of algorithm A2 includes a result of a K-fold transformed partial convolution operation on the PLD. Processing flow 400 may begin at block 405.

At block 405 (Provide PLD, compositions K, and memory space Memo), the processor may provide, obtain, or receive a PLD $P_\Gamma(\gamma)$ and a number K (the number of composition operations). The processor may also provide or reserve a memory space (Memo) to store e.g., intermediate result(s). It is to be understood that the PLD $P_\Gamma(Y)$ (e.g., for a single DP operation, for a single query or operation, etc.), the number K, and the space Memo are inputs to algorithm A2, and the output of algorithm A2 is a result of the K-fold transformed partial convolution operation on the PLD ($P_\Gamma(\gamma)$ ⊛K ). It is also to be understood that the result of the K-fold transformed partial convolution operation $P_\Gamma(\gamma)$⊛K may be represented as $P_\Gamma(\gamma)$⊛$P_\Gamma(\gamma)$ ... ⊛$P_\Gamma(\gamma)$, where $P_\Gamma(\gamma)$ may appear K times in the transformed partial convolution operations. The result $P_\Gamma(\gamma)$⊛K may be used to determine an overall PLD of the privacy-protection mechanism M after the K-fold composition. See descriptions for block 240 of FIG. 2. Processing may proceed from block 405 to block 410.

At block 410 (K in Memo?), the processor may determine or check whether a result of a K-fold transformed partial convolution operation is already in the space Memo. For example, when Memo is an array data structure and K is used as an index, Memo[K] may represent the result of a K-fold transformed partial convolution operation stored in the space Memo. When Memo[K] is not empty (or when the result of a K-fold transformed partial convolution operation is in the space Memo), processing may proceed from block 410 to block 415. When Memo[K] is empty (or when the result of a K-fold transformed partial convolution operation is not in the space Memo), processing may proceed from block 410 to block 420.

At block 415 (Return Memo[K]), the processor may return the result of the K-fold transformed partial convolution operation (which is stored in the space Memo) as a result of the K-fold transformed partial convolution operation of the PLD $P_\Gamma(\gamma)$. It is to be understood that the result Memo[K] is also the output of an invocation of algorithm A2, and the current invocation (e.g., for recursive invocation purpose, etc.) of algorithm A2 ends at block 415.

At block 420 (K=2?), the processor may determine or check whether the number K is equal to 2. When the number K is equal to 2, processing may proceed from block 420 to block 425. When the number K is not equal to 2, processing may proceed from block 420 to block 430.

At block 425 (Determine PLD, Memo[K]=PLD, Return PLD), the processor may invoke algorithm A1 using $P_\Gamma(\gamma)$ as both the first PLD and the second PLD inputs. The processor may also store the output of algorithm A1 in a variable PLD. That is, variable PLD=A1($P_\Gamma(\gamma)$, $P_\Gamma(\gamma)$). The processor may further store or save the variable PLD in the space Memo (e.g., using K as the index such that Memo[K]=the variable PLD). The processor may return the variable PLD as a result of the K-fold transformed partial convolution operation of the PLD $P_\Gamma(\gamma)$. It is to be understood that the variable PLD is also the output of an invocation of algorithm A2, and the current invocation of algorithm A2 ends at block 425.

At block 430 (K is even?), the processor may determine or check whether the number K is an even number. When the number K is an even number, processing may proceed from block 430 to block 435. When the number K is not an even number, processing may proceed from block 430 to block 450.

At block 435 (K/2 in Memo?), the processor may determine or check whether a result of a K/2-fold transformed partial convolution operation is already in the space Memo, where K/2 is K divided by 2. For example, when Memo is an array data structure and K/2 is used as an index, Memo[K/2] may represent the result of a K/2-fold transformed partial convolution operation stored in the space Memo. When Memo[K/2] is not empty (or when the result of a K/2-fold transformed partial convolution operation is in the space Memo), processing may proceed from block 435 to block 440. When Memo[K/2] is empty (or when the result of a K/2-fold transformed partial convolution operation is not in the space Memo), processing may proceed from block 435 to block 445.

At block 440 (Determine PLD), the processor may invoke algorithm A1 using Memo[K/2] as both the first PLD and the second PLD inputs. The processor may also store the output of algorithm A1 in the variable PLD. That is, variable PLD=A1(Memo[K/2], Memo[K/2]). Processing may proceed from block 440 to block 465.

At block 445 (Determine PLD), the processor may invoke algorithm A1 using an output of algorithm A2 (i.e., a recursive invocation of algorithm A2) as both the first PLD and the second PLD inputs. The invocation of algorithm A2 may use the PLD $P_\Gamma$, the number K/2, and the space Memo as inputs. The processor may also store the output of the algorithm A1 in the variable PLD. That is, variable PLD=A1 (A2($P_\Gamma$, K/2), A2($P_\Gamma$, K/2)), where the space Memo is visible or available as an input to algorithm A2. Processing may proceed from block 445 to block 465.

At block 450 (K−1 in Memo?), the processor may determine or check whether a result of a (K−1)-fold transformed partial convolution operation is already in the space Memo. For example, when Memo is an array data structure and K−1 is used as an index, Memo[K−1] may represent the result of a (K−1)-fold transformed partial convolution operation stored in the space Memo. When Memo[K−1] is not empty (or when the result of a (K−1)-fold transformed partial convolution operation is in the space Memo), processing may proceed from block 450 to block 455. When Memo[K−1] is empty (or when the result of a (K−1)-fold transformed partial convolution operation is not in the space Memo), processing may proceed from block 450 to block 460.

At block 455 (Determine PLD), the processor may invoke algorithm A1 using Memo [K−1] as the first PLD input and using the PLD $P_\Gamma$ as the second PLD input. The processor may also store the output of the algorithm A1 in the variable PLD. That is, variable PLD=A1(Memo[K−1], $P_\Gamma$). Processing may proceed from block 455 to block 465.

At block 460 (Determine PLD), the processor may invoke algorithm A1 using an output of algorithm A2 (i.e., a recursive invocation of algorithm A2) as the first PLD input and using the PLD $P_\Gamma$ as the second PLD input. The invocation of algorithm A2 may use the PLD $P_\Gamma$, the number K−1, and the space Memo as inputs. The processor may also store the output of the algorithm A1 in the variable PLD. That is, variable PLD=A1(A2($P_\Gamma$, K−1), $P_\Gamma$), where the space Memo is visible or available as an input to the algorithm A2. Processing may proceed from block 460 to block 465.

At block 465 (Memo[K]=PLD, Return PLD), the processor may store or save the variable PLD in the space Memo (e.g., using K as the index such that Memo[K]=the variable PLD). The processor may return the variable PLD as a result of the K-fold transformed partial convolution operation of the PLD $P_\Gamma(\gamma)$. It is to be understood that the variable PLD is also the output of an invocation of algorithm A2, and the current invocation of algorithm A2 ends at block 465.

It is to be understood that algorithm A2 is built upon algorithm A1 but extends algorithm A1 to a K-fold transformed partial convolution determination. Algorithm A2 may follow a framework of dynamic programming (e.g., by using a recursive revocation of the algorithm A2 itself, using a space to store an intermediate result, etc.), which may reduce the computation complexity by storing intermediate results in a short-term memory, then invoking them (e.g., reusing the intermediate results, etc.) whenever they appear again. For algorithm A2, a computation complexity of calculating a K-fold composition may be $\mathcal{O}((K[\gamma])^2 \log K)$. For example, when using algorithm A2 to determine an 8-fold composition $P_\Gamma(8)$, $P_\Gamma(2)$ may be determined using algorithm A1 (e.g., $P_\Gamma(2)$ is to be determined as $P_\Gamma(1)$ ⊛ $P_\Gamma(1)$), and the result of $P_\Gamma(2)$ may be saved or stored in the space Memo. $P_\Gamma(4)$ may be determined using algorithm A1 (e.g., $P_\Gamma(4)$ is to be determined as $P_\Gamma(2)$ ⊛ $P_\Gamma(2)$), where $P_\Gamma(2)$ is from the space Memo and the result of $P_\Gamma(4)$ may be saved or stored in the space Memo. $P_\Gamma(8)$ may be determined using algorithm A1 (e.g., $P_\Gamma(8)$ is to be determined as $P_\Gamma(4)$ ⊛ $P_\Gamma(4)$), where $P_\Gamma(4)$ is from the space Memo.

FIGS. 5A-5F illustrate an example process for determining a probability for a differential privacy configuration based on a convolution operation of a privacy loss distribution, in accordance with at least some embodiments described herein.

Figure 5A:
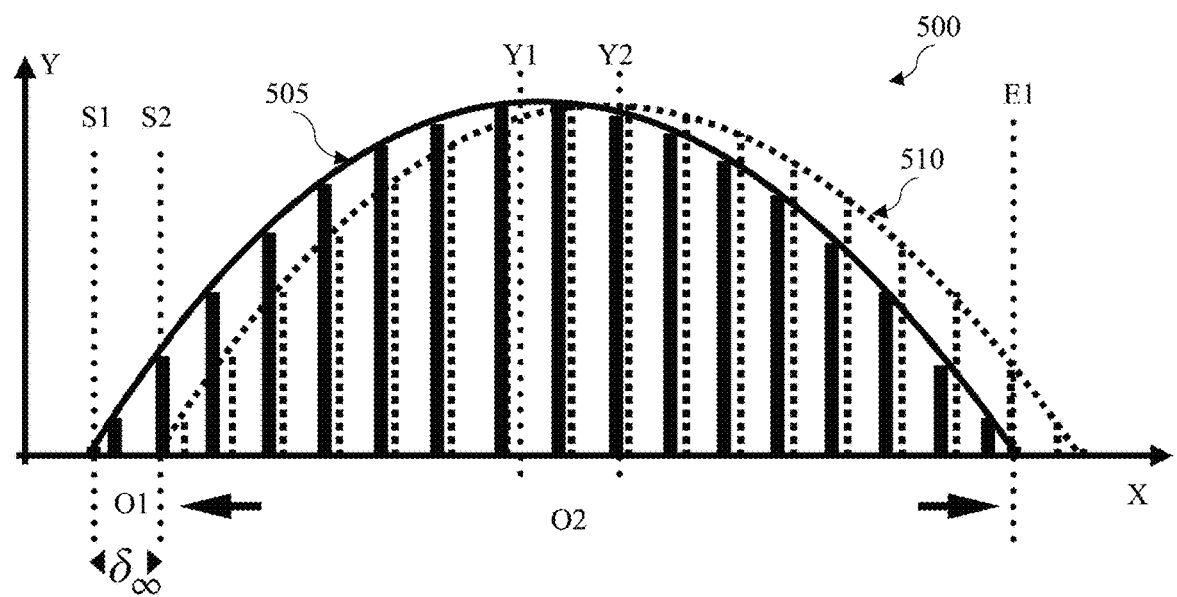
FIGS. 5A-5F illustrate an example process for determining a probability for a differential privacy configuration based on a convolution operation of a privacy loss distribution, in accordance with at least some embodiments described herein.

FIG. 5A illustrates an example noise distribution 500 of a differential privacy for dataset(s). As shown in FIG. 5A, the X coordinate represents the possible values of the outputted noise, and the Y coordinate represents the probability of the corresponding possible values of the outputted noise. The curve 505 (solid line) represents a result after noise being added to the real output value (Y1). S1 represents the starting point/noise of the curve 505, and E1 represents the ending point/noise of the curve 505. The curve 510 (dotted line) represents a result after noise being added to the real output value (Y1) plus a sensitivity Δ (i.e., Y2=Y1+Δ). It is to be understood that a sensitivity is a term of art in differential privacy and a sensitivity of a function may reflect an amount the function's output may change when the input of the function changes. S2 represents the starting point/noise of the curve 510, and E2 represents the ending point/noise of the curve 510. O1 represents the non-overlapping area/range (where the corresponding probability δ may be infinity) of the curve 505 and the curve 510, and O2 represents the overlapping area/range of the curve 505 and the curve 510. In an example embodiment, the curve 505 may represent the noise distribution for a dataset A, and the curve 510 may represent the noise distribution for a neighboring dataset A' (see the description of block 210).

Figure 5B:
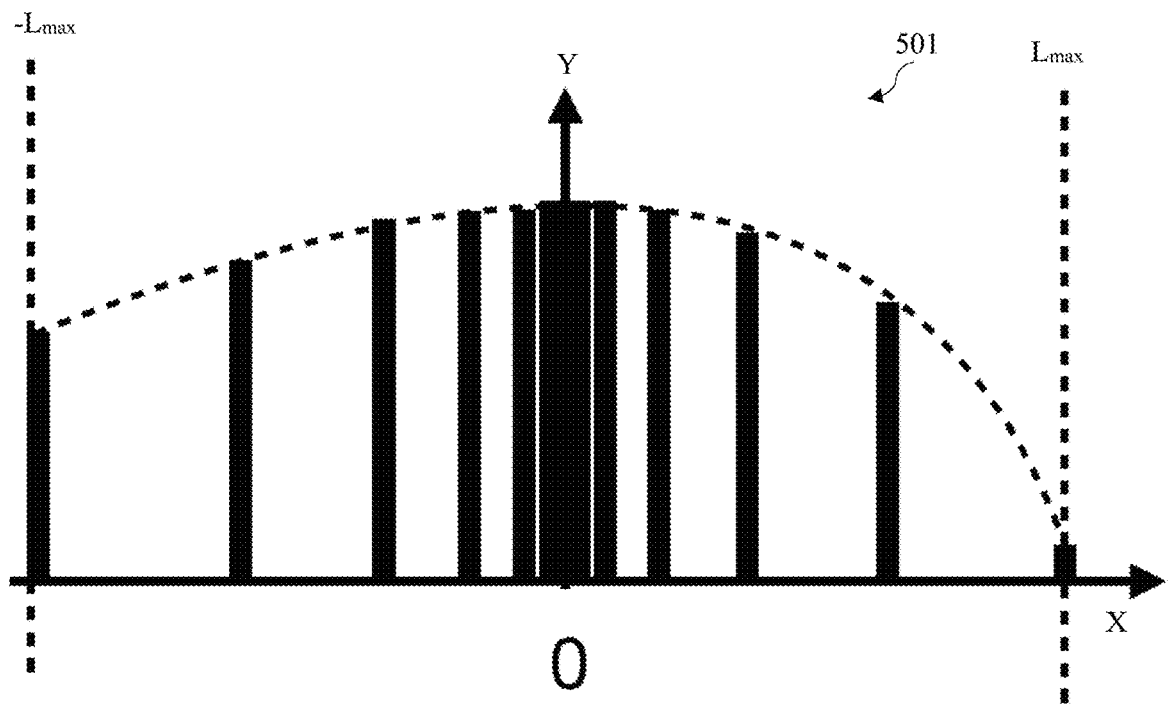

FIG. 5B illustrates an example privacy loss distribution (PLD) 501 generated using the noise distributions (505, 510) of FIG. 5A. See the description of block 220 regarding how to generate the PLD. As shown in FIG. 5B, the X coordinate represents the values of the privacy loss/leakage (a natural logarithm result, see the description of "I" in block 220), and the Y coordinate represents the corresponding probability of the privacy loss/leakage. $L_{max}$ represents the maximum positive value of the privacy leakage/loss, and $-L_{max}$ represents the maximum negative value of the privacy leakage/loss.

Figure 5C:
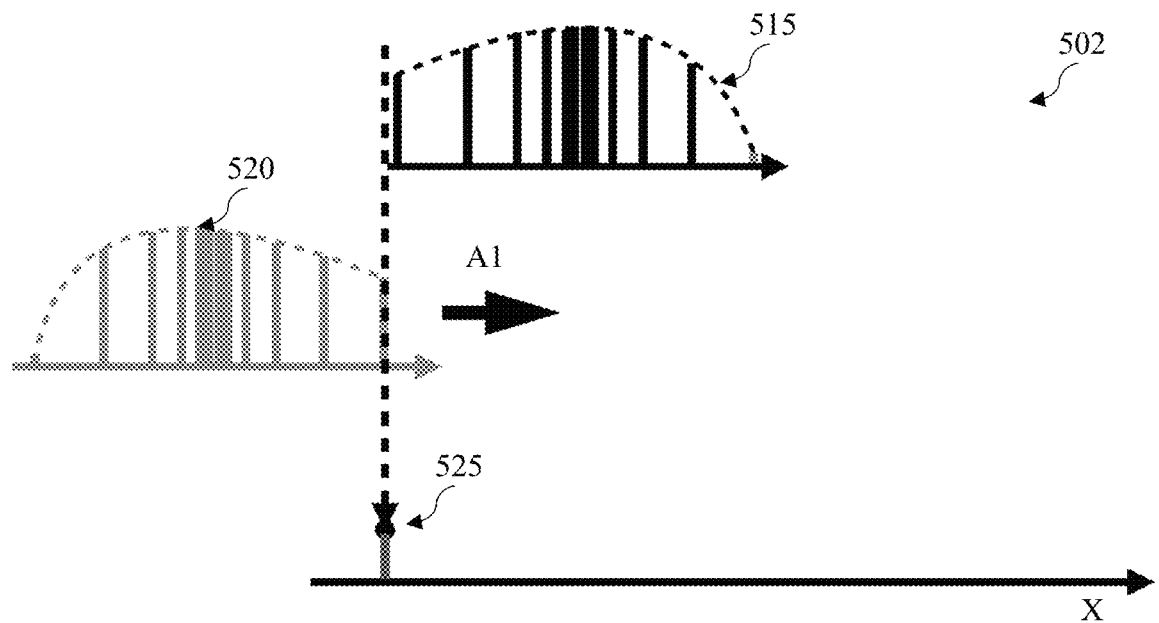
Figure 5D:
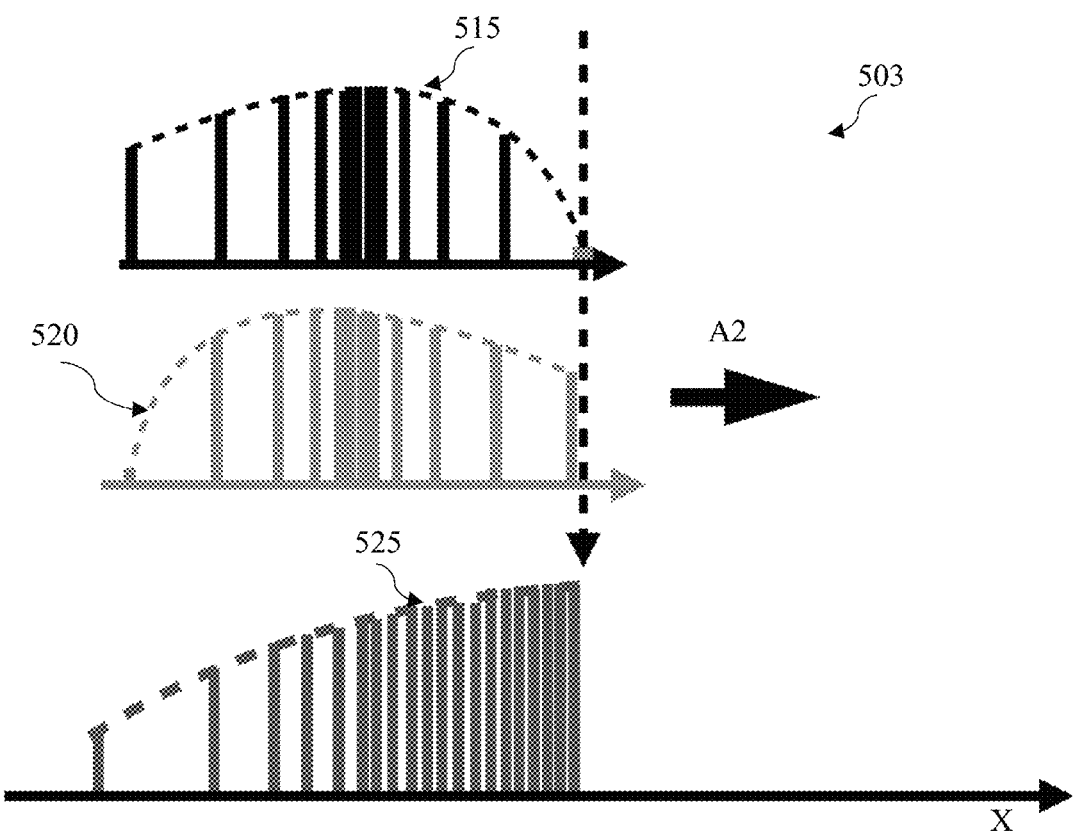
Figure 5E:
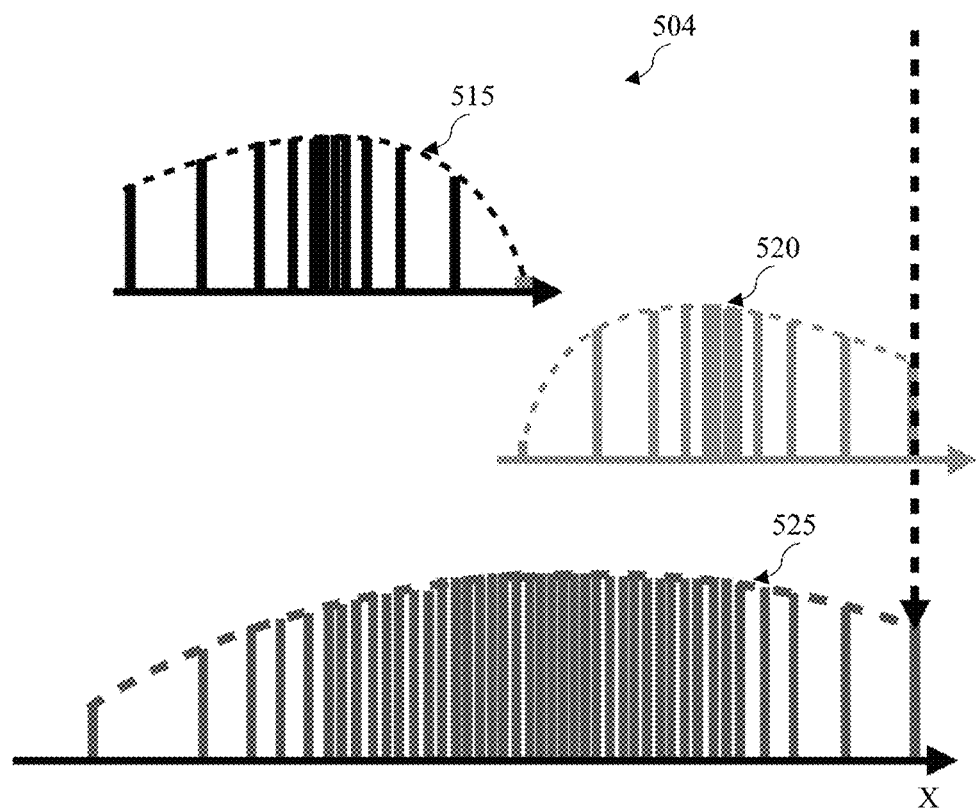

FIGS. 5C-5E illustrates an example convolution operation of the PLD 515 (e.g., function f) and the PLD 520 (e.g., function g) to generate the convolution result 525 (e.g., function f⊛g). It is to be appreciated that the convolution operation described in FIGS. 5C-5E is a full convolution, where the full set of data from the function f and/or the full set of data from the function g are used or involved in the convolution operation. In an example embodiment, f and g may be the same function (and g may be the reflection of f along the left-most axis of f for convolution operation purpose), and the convolution result of f and g may be represented as f⊛². In FIGS. 5C-5E, the X coordinate is the same as the X coordinate of FIG. 5B, and the Y coordinate (not shown) is the same as the Y coordinate of FIG. 5B.

FIG. 5C illustrates a first stage 502 of the convolution operation, where the convolution operation is firstly performed based on the left-most data (e.g., a minimum value of the privacy leakage/loss) of the PLD 515 and the right-most data (e.g., a maximum value of the privacy leakage/loss) of the PLD 520, to generate the first/left-most portion of the convolution result 525. Then the PLD 520 is shifting to the right along the direction A1, and the convolution operation is continuing until reaching the second stage.

FIG. 5D illustrates a second stage 503 of the convolution operation, where the convolution operation is firstly performed based on the overlapping data/area of the PLD 515 and the PLD 520, to generate the second/middle portion of the convolution result 525. Then the PLD 520 is shifting to the right along the direction A2, and the convolution operation is continuing for the third stage.

FIG. 5E illustrates a third stage 504 of the convolution operation, where the convolution operation is continuously performed until reaching the right-most data (e.g., a maximum value of the privacy leakage/loss) of the PLD 515 and the left-most data (e.g., a minimum value of the privacy leakage/loss) of the PLD 520, to generate the third/right-most portion of the convolution result 525.

Figure 5F:
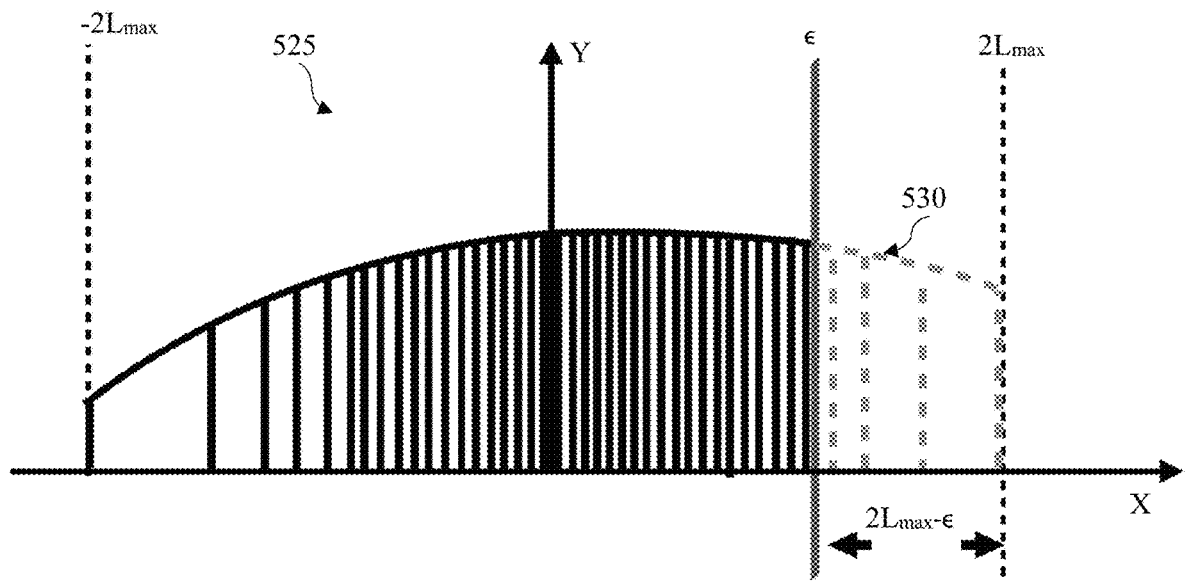

FIG. 5F illustrates the convolution result 525. As shown in FIG. 5F, the X coordinate represents the convolutional leakage, and the Y coordinate represents the probability of the corresponding convolutional leakage. It is to be understood that from the convolution result 525, the privacy leakage/loss possibility δ (of the DP configuration) may be determined based on the privacy budget ε (of the DP configuration). For example, from the point ε to the point $K^*L_{max}$, the integral section 530 (in dotted lines, having a length $K^*L_{max}-\epsilon$) may correspond to the possibility δ, where K is the number of DP composition operations (which is also the number of the convolution operations). In the example of FIG. 5F, K is equal to two. In other example embodiments, K is greater than two. That is, in the convolution result 525, the integral section 530 may correspond to the possibility δ, and those section(s) left to the integral section 530 is/are not used for determining the possibility δ and may be skipped in the convolution computation (i.e., a partial convolution may be performed based on the integral section 530 only, to achieve the same results in determining the possibility δ with a reduced computation complexity).

FIGS. 6A-6F illustrate an example process for determining a probability for a differential privacy configuration based on a transformed partial convolution operation of a privacy loss distribution, in accordance with at least some embodiments described herein.

Figure 6A:
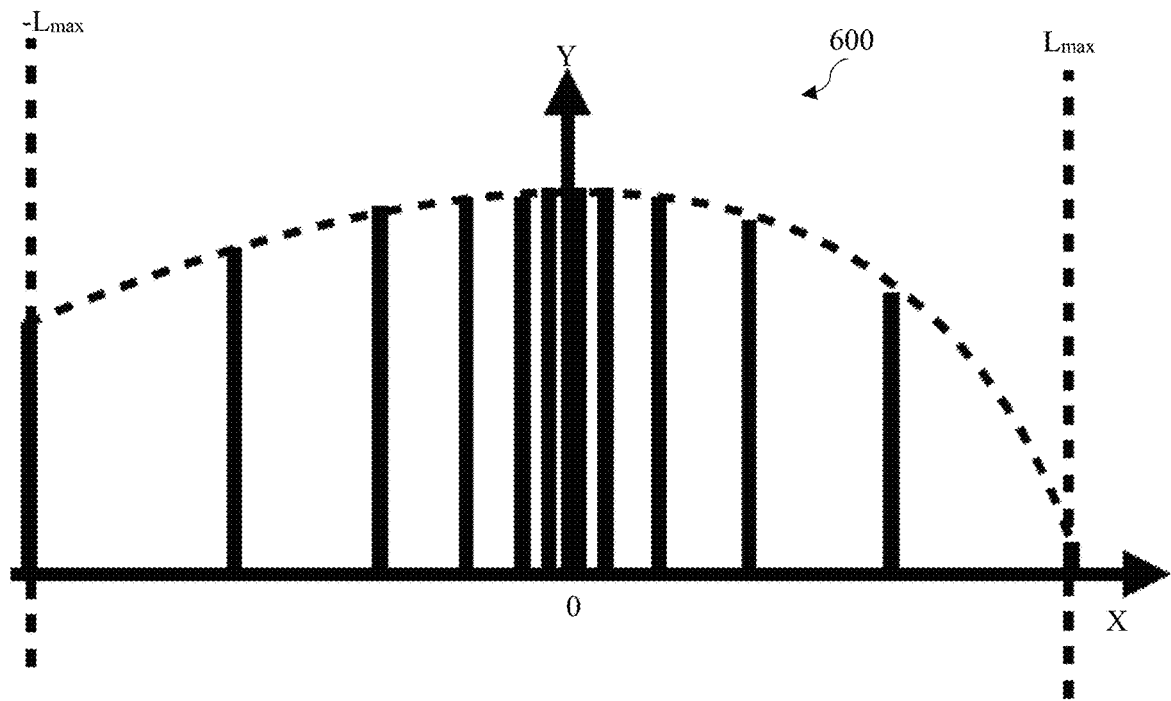
FIGS. 6A-6F illustrate an example process for determining a probability for a differential privacy configuration based on a transformed partial convolution operation of a privacy loss distribution, in accordance with at least some embodiments described herein.

FIG. 6A illustrates an example privacy loss distribution (PLD) 600. It is to be understood that the PLD 600 may be the PLD 501 of FIG. 5B. The X coordinate represents the values of the privacy loss/leakage, and the Y coordinate represents the corresponding probability of the privacy loss/leakage. $L_{max}$ represents the maximum positive value of the privacy leakage/loss, and $-L_{max}$ represents the maximum negative value of the privacy leakage/loss.

Figure 6B:
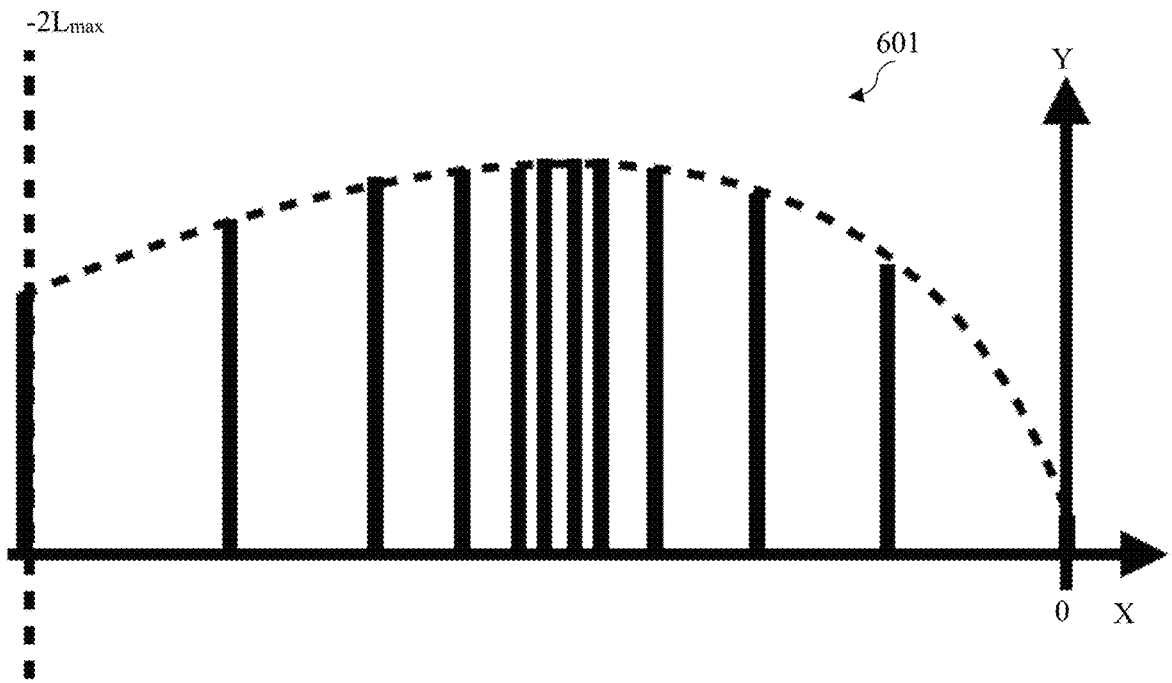

FIG. 6B illustrates a PLD 601 transformed from the PLD 600 of FIG. 6A. In an example embodiment, the transforming of the PLD 600 includes translating the PLD 600 to generate the PLD 601. For example, the PLD 600 is translated (shifted to the left) along the X coordinate by a predetermined amount (e.g., $L_{max}$) to generate the PLD 601.

Figure 6C:
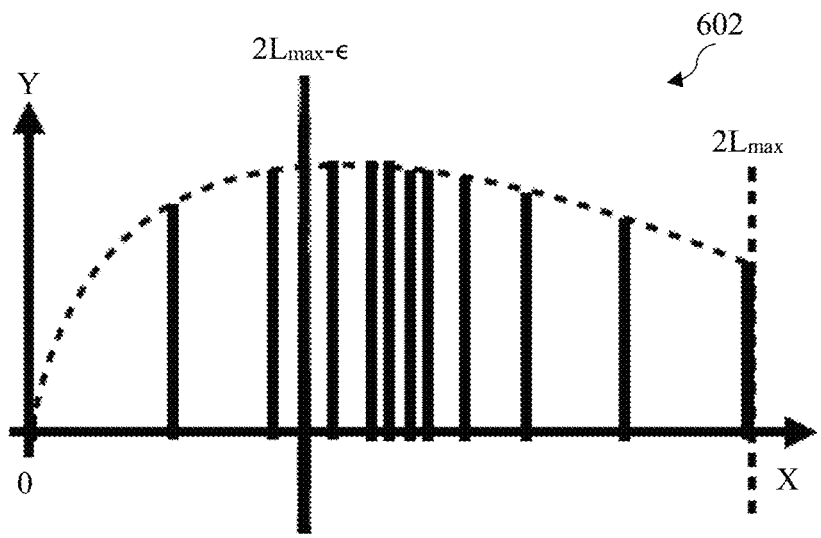

FIG. 6C illustrates a PLD 602 transformed from the PLD 601 of FIG. 6B. In an example embodiment, the transforming of the PLD 601 includes reflecting the PLD 601 to generate the PLD 602. For example, the PLD 601 is reflected about the Y coordinate to generate the PLD 602. In an example embodiment, the transforming (e.g., reflecting) of the PLD 601 to generate the PLD 602 may be optional.

Figure 6D:
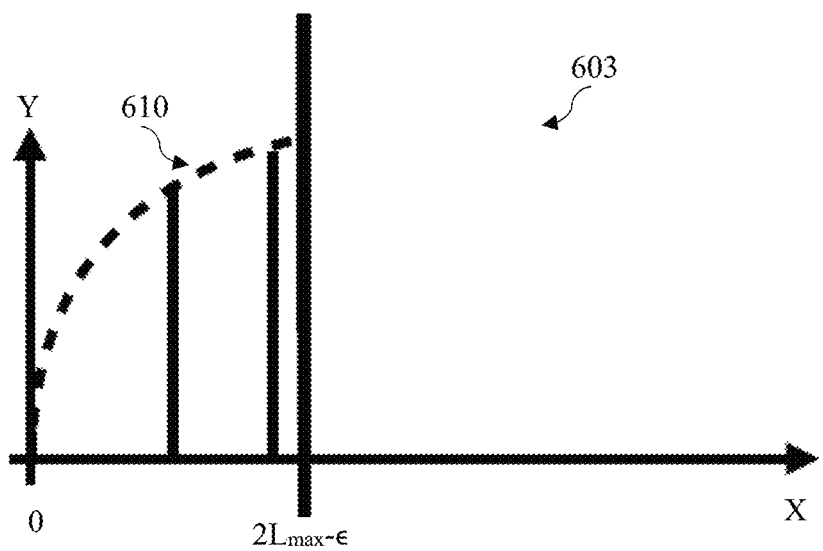

FIG. 6D illustrates a PLD 603 (e.g., the partial PLD 610) transformed from the PLD 602 of FIG. 6C. In an example embodiment, the transforming of the PLD 602 includes truncating the PLD 602 to generate the PLD 603 (e.g., the partial PLD 610). For example, the PLD 602 is truncated at the privacy loss/leakage value $K^*L_{max}-\epsilon$ (e.g., $2L_{max}-\epsilon$ when K=2) to generate the PLD 603 e.g., by discarding all the data where the privacy loss/leakage value is greater than $K^*L_{max}-\epsilon$. It is to be understood that when the transforming (e.g., reflecting) of the PLD 601 to generate the PLD 602 is optional, the transforming (e.g., truncating) operation may be based on the PLD 601 of FIG. 6B, e.g., at the privacy loss/leakage value $-(K^*L_{max}-\epsilon)$ to generate the partial PLD. In such embodiment, the results (e.g., 620 of FIG. 6E and/or 630 of FIG. 6F) may need to be multiplied by negative one to make up the skipped reflecting operation.

Figure 6E:
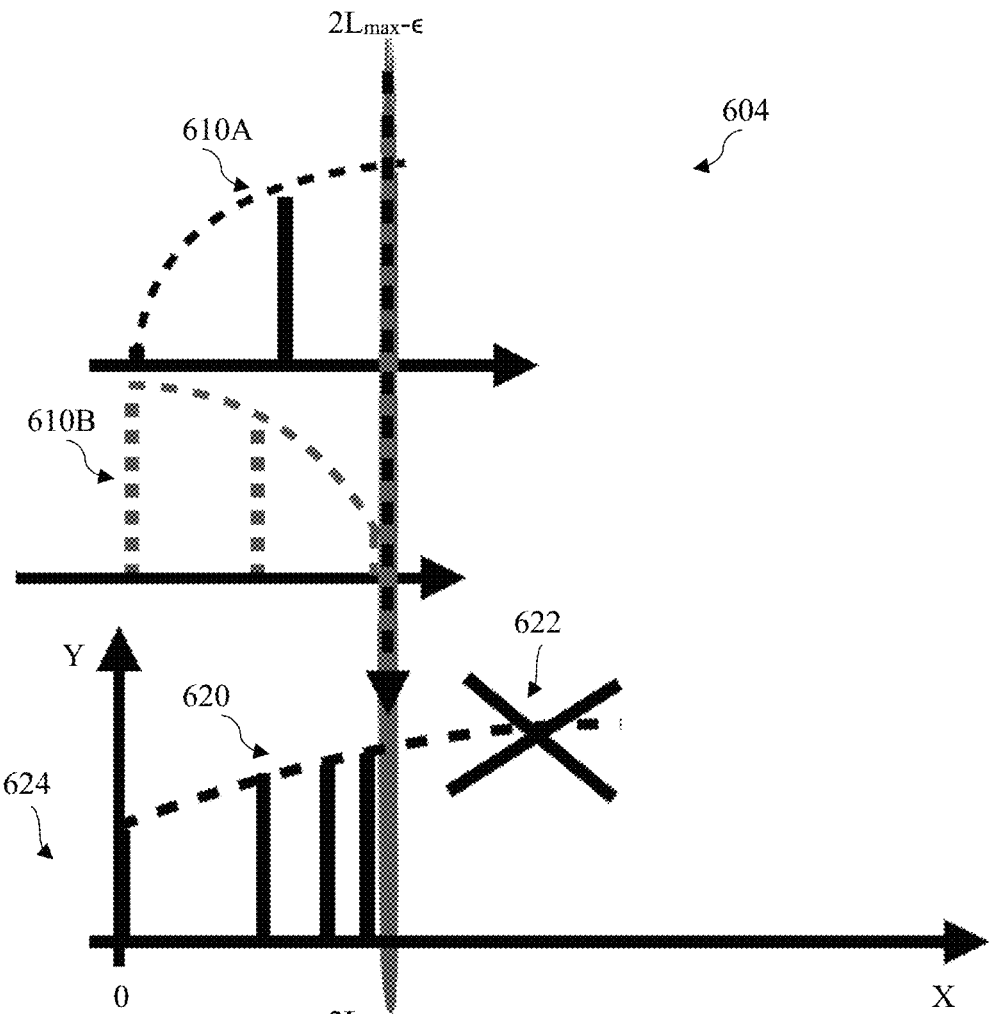

FIG. 6E illustrates an example partial convolution operation on the partial PLD 610A and the partial PLD 610B to generate the partial convolution result 620. In an example embodiment, the partial PLD 610A and/or 610B may be the partial PLD 610 of FIG. 6D. That is, in the partial convolution operation, portion(s) of data (e.g., partial PLDs 610, 610A, 610B, etc.) instead of the full set of data from the full or complete PLDs (e.g., 601, 602, etc.) are used or involved in the convolution operation.

In an example embodiment, the partial PLD 610A may be the same as the partial PLD 610B (and a reflection of the partial PLD 610A may be used as the partial PLD 610B for the purpose of the partial convolution operation). In another example embodiment, the partial PLD 610A may be different from the partial PLD 610B.

As shown in FIG. 6E, in the partial convolution operation, not only partial PLD(s) (610A. 610B) are used or involved, but also the convolution computation/operation may only be performed for the data range (e.g., the privacy loss/leakage being from 0 to $K*L_{max}-\epsilon$, all inclusive) where the partial PLD 610A overlaps the partial PLD 610B. That is, the convolution computation/operation may skip the portion 624 (e.g., the privacy loss/leakage being less than 0) and/or the portion 622 (marked with a cross, e.g., the privacy loss/leakage being greater than $K*L_{max}-\epsilon$) where the partial PLD 610A does not overlap the partial PLD 610B. For example, the first stage 502 of FIG. 5C and/or the third stage 504 of FIG. 5E may be skipped, and only the second stage 503 of FIG. 5D of the convolution operation may be performed to achieve the partial convolution operation.

Figure 6F:
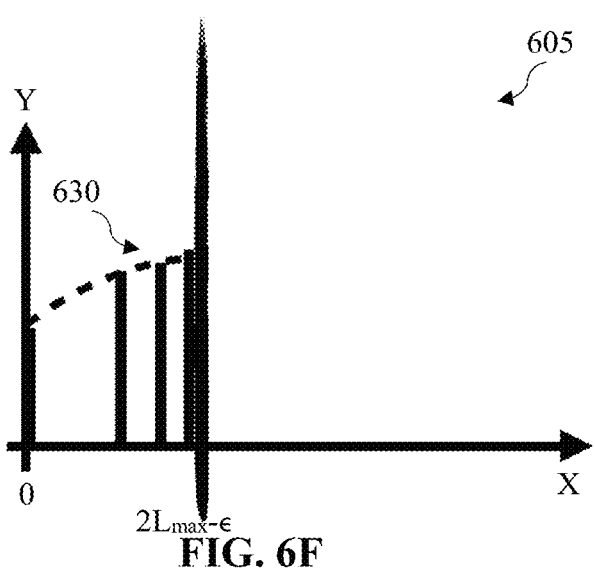

FIG. 6F illustrates an example integration operation (e.g., to perform an integral of the partial convolution result 620 of FIG. 6E) to generate the possibility δ (630). It is to be understood that the possibility δ (630) may be the same as the possibility δ (530) of FIG. 5F, or the same as a reflection (e.g., a reflection along the Y coordinate without changing the starting and ending values on the X coordinate) of the possibility δ 530 of FIG. 5F.

It is to be understood that the integral section 530 may be determined when the PLD, the times of the composition K, and the privacy budget $\epsilon$ are given (e.g., from the PLD, the $L_{max}$ is determined, and the integral section is within the range of $[\epsilon, K*L_{max}]$). Features in the embodiments disclosed herein may skip (e.g., not computing) unnecessary intermediate values, and provide an algorithm that only computes the convolution in the integral section (e.g., 530 of FIG. 5F) rather than on the whole PLD. e.g., via a partial convolution. Features in the embodiments disclosed herein may also achieve the partial convolution through transforming the PLD (e.g., via a linear transformation and/or truncation).

Testing data show that features in the embodiments disclosed herein may provide an algorithm running much faster (e.g., up to about 10,000 times faster) than a Fast Fourier Transformation (FFT) based algorithm, and faster (e.g., up to about 3 times faster) than a full convolution based algorithm, e.g. for a small noise factor τ (e.g., about 5 to about 20) and a small K (e.g., about 5). Testing data also show that for a large noise factor τ (e.g., about 50 to about 100) and a large K (e.g., about 15), features in the embodiments disclosed herein may provide an algorithm providing a tighter or smaller δ than the FFT based algorithm (since the FFT transformation may incur error in estimation) and running faster than a full convolution based algorithm.

It is also to be understood that features in the embodiments disclosed herein may work for all types of discrete DP mechanisms. For example, given any PLD, the algorithm disclosed herein may be able to provide a tightened pair of (ε, δ) as DP parameters. Features in the embodiments disclosed herein may also be combined with other fast convolution determination (e.g., estimation) algorithms, such as a hash-map-based fast determination, an FFT-based determination, a full convolution based determination, etc. Features in the embodiments disclosed herein may further achieve zero error since there is no computational loss with regard to the determination of the privacy loss/leakage possibility δ. Also, features in the embodiments disclosed herein may increase efficiency by computing only the integral section and by performing a linear transformation of the input PLD.

FIG. 7 is a schematic structural diagram of an example computer system 700 applicable to implementing an electronic device (for example, the server or one of the terminal devices shown in FIG. 1), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 715 may also store various data and programs required for operations of the system 700. The CPU 705, the ROM 710, and the RAM 715 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

It is to be understood that the processes described with reference to the flowcharts of FIGS. 2-4 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 745, and/or may be installed from the removable medium 755. The computer program, when being executed by the central processing unit (CPU) 705, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

It is appreciated that any one of aspects can be combined with each other.

Aspect 1. A method for differential privacy composition determination in a secure communication, the method comprising: determining a differential privacy configuration including a first privacy parameter and a second privacy parameter; determining a privacy loss distribution; performing a partial convolution operation of the privacy loss distribution by: transforming the privacy loss distribution based on a predetermined parameter; determining an integral range based on the first privacy parameter and the privacy loss distribution; transforming the privacy loss distribution based on the integral range; and performing the partial convolution operation based on the integral range; determining the second privacy parameter based on a result of the partial convolution operation; and controlling a dataset based on the differential privacy configuration to limit access to the dataset.

Aspect 2. The method of aspect 1, wherein the transforming of the privacy loss distribution based on the predetermined parameter includes translating the privacy loss distribution.

Aspect 3. The method of aspect 2, wherein the transforming of the privacy loss distribution based on the predetermined parameter further includes after the translating of the privacy loss distribution, reflecting the privacy loss distribution.

Aspect 4. The method of any one of aspects 1-3, wherein the transforming of the privacy loss distribution based on the integral range includes truncating the privacy loss distribution based on the integral range by discarding a portion of the privacy loss distribution at a point where a privacy leakage value is greater than the integral range.

Aspect 5. The method of any one of aspects 1-4, wherein K is a number of convolution operations, K is greater than two, the performing of the partial convolution operation of the privacy loss distribution includes performing a K-fold partial convolution operation of the privacy loss distribution.

Aspect 6. The method of aspect 5, wherein the determining of the integral range includes determining the integral range based on the first privacy parameter, the number of convolution operations K, and the privacy loss distribution.

Aspect 7. The method of any one of aspects 1-6, further comprising: adjusting a number of composition operations based on the first privacy parameter and the second privacy parameter.

Aspect 8. The method of aspect 7, wherein the adjusting of the number of composition operations includes: decreasing the number of composition operations when the first or second privacy parameter is greater than a first predetermined threshold; and increasing the number of composition operations when the first or second privacy parameter is less than a second predetermined threshold.

Aspect 9. A differential privacy composition determination system comprising: a memory to store a dataset; and a processor to: determine a differential privacy configuration including a first privacy parameter and a second privacy parameter; determine a privacy loss distribution; perform a partial convolution operation of the privacy loss distribution by: transforming the privacy loss distribution based on a predetermined parameter; determining an integral range based on the first privacy parameter and the privacy loss distribution; transforming the privacy loss distribution based on the integral range; and performing the partial convolution operation based on the integral range; determine the second privacy parameter based on a result of the partial convolution operation; and control a dataset based on the differential privacy configuration to limit access to the dataset.

Aspect 10. The system of aspect 9, wherein the transforming of the privacy loss distribution based on the predetermined parameter includes translating the privacy loss distribution.

Aspect 11. The system of aspect 10, wherein the transforming of the privacy loss distribution based on the predetermined parameter further includes after the translating of the privacy loss distribution, reflecting the privacy loss distribution.

Aspect 12. The system of any one of aspects 9-11, wherein the transforming of the privacy loss distribution based on the integral range includes truncating the privacy loss distribution based on the integral range.

Aspect 13. A non-transitory computer-readable medium having computer-executable instructions stored thereon that, upon execution, cause one or more processors to perform operations comprising: determining a differential privacy configuration including a first privacy parameter and a second privacy parameter; determining a privacy loss distribution; performing a partial convolution operation of the privacy loss distribution by: transforming the privacy loss distribution based on a predetermined parameter; determining an integral range based on the first privacy parameter and the privacy loss distribution; transforming the privacy loss distribution based on the integral range; and performing the partial convolution operation based on the integral range; determining the second privacy parameter based on a result of the partial convolution operation; and controlling a dataset based on the differential privacy configuration to limit access to the dataset.

Aspect 14. The computer-readable medium of aspect 13, wherein the transforming of the privacy loss distribution based on the predetermined parameter includes translating the privacy loss distribution.

Aspect 15. The computer-readable medium of aspect 14, wherein the transforming of the privacy loss distribution based on the predetermined parameter further includes after the translating of the privacy loss distribution, reflecting the privacy loss distribution.

Aspect 16. The computer-readable medium of any one of aspects 13-15, wherein the transforming of the privacy loss distribution based on the integral range includes truncating the privacy loss distribution based on the integral range.

Aspect 17. The computer-readable medium of any one of aspects 13-16, wherein K is a number of convolution operations, K is greater than two, the performing of the partial convolution operation of the privacy loss distribution includes performing a K-fold partial convolution operation of the privacy loss distribution.

Aspect 18. The computer-readable medium of aspect 17, wherein the determining of the integral range includes determining the integral range based on the first privacy parameter, the number of convolution operations K, and the privacy loss distribution.

Aspect 19. The computer-readable medium of any one of aspects 13-18, the operations further comprise: adjusting a number of composition operations based on the first privacy parameter and the second privacy parameter.

Aspect 20. The computer-readable medium of aspect 19, wherein the adjusting of the number of composition operations includes: decreasing the number of composition operations when the first or second privacy parameter is greater than a first predetermined threshold; and increasing the number of composition operations when the first or second privacy parameter is less than a second predetermined threshold.

Aspect 21. A method for differential privacy composition determination in secure computation and communication of a dataset, the method comprising: determining a differential privacy configuration that includes a first privacy parameter and a second privacy parameter; determining a privacy loss distribution; providing a number of composition operations; determining a third privacy parameter and a fourth privacy parameter for a differential privacy composition based on the differential privacy configuration, the privacy loss distribution, and the number of composition operations; and controlling the dataset based on at least one of the third privacy parameter and the fourth privacy parameter.

Aspect 22. The method of aspect 21, further comprising: adjusting the number of composition operations based on the third privacy parameter and the fourth privacy parameter.

Aspect 23. The method of aspect 22, wherein the adjusting of the number of composition operations based on the third privacy parameter and the fourth privacy parameter includes: decreasing the number of composition operations when the third privacy parameter is greater than a first predetermined threshold; and decreasing the number of composition operations when the fourth privacy parameter is greater than a second predetermined threshold.

Aspect 24. The method of aspect 22 or aspect 23, wherein the adjusting of the number of composition operations based on the third privacy parameter and the fourth privacy parameter includes: increasing the number of composition operations when the third privacy parameter is less than a third predetermined threshold; and increasing the number of composition operations when the fourth privacy parameter is less than a fourth predetermined threshold.

Aspect 25. The method of any one of aspects 22-24, further comprising: updating the third privacy parameter and the fourth privacy parameter for the differential privacy composition based on the differential privacy configuration, the privacy loss distribution, and the adjusted number of composition operations.

Aspect 26. The method of any one of aspects 21-25, further comprising: performing a K-fold convolution (or transformed partial convolution) operation of the privacy loss distribution, wherein K is the number of composition operations.

Aspect 27. The method of aspect 26, wherein the performing of the K-fold convolution (or transformed partial convolution) operation of the privacy loss distribution includes: producing a hash map based on the privacy loss distribution; and performing a convolution (or transformed partial convolution) operation of the privacy loss distribution using the produced hash map.

Aspect 28. The method of aspect 27, the performing of the K-fold convolution (or transformed partial convolution) operation of the privacy loss distribution further includes: storing an intermediate convolution (or transformed partial convolution) result in a memory; and performing a convolution (or transformed partial convolution) operation of the intermediate convolution (or transformed partial convolution) result.

Aspect 29. A differential privacy composition determination system in secure computation and communication of a dataset, the system comprising: a memory to store the dataset; and a processor to: determine a differential privacy configuration that includes a first privacy parameter and a second privacy parameter; determine a privacy loss distribution; provide a number of composition operations; determine a third privacy parameter and a fourth privacy parameter for a differential privacy composition based on the differential privacy configuration, the privacy loss distribution, and the number of composition operations; and control the dataset based on at least one of the third privacy parameter and the fourth privacy parameter.

Aspect 30. The system of aspect 29, wherein the processor is to further: adjust the number of composition operations based on the third privacy parameter and the fourth privacy parameter.

Aspect 31. The system of aspect 30, wherein the processor is to further: decrease the number of composition operations when the third privacy parameter is greater than a first predetermined threshold; and decrease the number of composition operations when the fourth privacy parameter is greater than a second predetermined threshold.

Aspect 32. The system of aspect 30 or aspect 31, wherein the processor is to further: increase the number of composition operations when the third privacy parameter is less than a third predetermined threshold; and increase the number of composition operations when the fourth privacy parameter is less than a fourth predetermined threshold.

Aspect 33. The system of any one of aspects 30-32, wherein the processor is to further: update the third privacy parameter and the fourth privacy parameter for the differential privacy composition based on the differential privacy configuration, the privacy loss distribution, and the adjusted number of composition operations.

Aspect 34. The system of any one of aspects 29-33, wherein the processor is to further: perform a K-fold convolution (or transformed partial convolution) operation of the privacy loss distribution, wherein K is the number of composition operations.

Aspect 35. The system of aspect 34, wherein the processor is to further: produce a hash map based on the privacy loss distribution; and perform a convolution (or transformed partial convolution) operation of the privacy loss distribution using the produced hash map.

Aspect 36. The system of aspect 35, wherein the processor is to further: store an intermediate convolution (or transformed partial convolution) result in the memory; and perform a convolution (or transformed partial convolution) operation of the intermediate convolution (or transformed partial convolution) result.

Aspect 37. A non-transitory computer-readable medium having computer-executable instructions stored thereon that, upon execution, cause one or more processors to perform operations comprising: determining a differential privacy configuration that includes a first privacy parameter and a second privacy parameter; determining a privacy loss distribution; providing a number of composition operations; determining a third privacy parameter and a fourth privacy parameter for a differential privacy composition based on the differential privacy configuration, the privacy loss distribution, and the number of composition operations; and controlling a dataset based on at least one of the third privacy parameter and the fourth privacy parameter.

Aspect 38. The computer-readable medium of aspect 37, the operations further comprise: adjusting the number of composition operations based on the third privacy parameter and the fourth privacy parameter.

Aspect 39. The computer-readable medium of aspect 38, the operations further comprise: decreasing the number of composition operations when the third privacy parameter is greater than a first predetermined threshold; and decreasing the number of composition operations when the fourth privacy parameter is greater than a second predetermined threshold.

Aspect 40. The computer-readable medium of aspect 38 or aspect 39, the operations further comprise: increasing the number of composition operations when the third privacy parameter is less than a third predetermined threshold; and increasing the number of composition operations when the fourth privacy parameter is less than a fourth predetermined threshold.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for determining differential privacy composition in a secure communication, the method comprising:
   determining a differential privacy configuration including a first privacy parameter and a second privacy parameter;
   determining a privacy loss distribution;
   performing a partial convolution operation of the privacy loss distribution by:
      transforming the privacy loss distribution based on a predetermined parameter;

determining an integral range based on the first privacy parameter and the privacy loss distribution;

transforming the privacy loss distribution based on the integral range; and performing the partial convolution operation based on the integral range;

determining the second privacy parameter based on a result of the partial convolution operation; and controlling a dataset based on the differential privacy configuration to limit access to the dataset.

2. The method of claim 1, wherein the transforming of the privacy loss distribution based on the predetermined parameter includes translating the privacy loss distribution.

3. The method of claim 2, wherein the transforming of the privacy loss distribution based on the predetermined parameter further includes after the translating of the privacy loss distribution, reflecting the privacy loss distribution.

4. The method of claim 1, wherein the transforming of the privacy loss distribution based on the integral range includes truncating the privacy loss distribution based on the integral range.

5. The method of claim 1, wherein K is a number of convolution operations, K is greater than two, the performing of the partial convolution operation of the privacy loss distribution includes performing a K-fold partial convolution operation of the privacy loss distribution.

6. The method of claim 5, wherein the determining of the integral range includes determining the integral range based on the first privacy parameter, the number of convolution operations K, and the privacy loss distribution.

7. The method of claim 1, further comprising:

adjusting a number of composition operations based on the first privacy parameter and the second privacy parameter.

8. The method of claim 7, wherein the adjusting of the number of composition operations includes:

decreasing the number of composition operations when the first or second privacy parameter is greater than a first predetermined threshold; and increasing the number of composition operations when the first or second privacy parameter is less than a second predetermined threshold.

9. A differential privacy composition determination system comprising:

a memory to store a dataset; and a processor to:

determine a differential privacy configuration including a first privacy parameter and a second privacy parameter;

determine a privacy loss distribution;

perform a partial convolution operation of the privacy loss distribution by:

transforming the privacy loss distribution based on a predetermined parameter;

determining an integral range based on the first privacy parameter and the privacy loss distribution;

transforming the privacy loss distribution based on the integral range; and performing the partial convolution operation based on the integral range;

determine the second privacy parameter based on a result of the partial convolution operation; and control the dataset based on the differential privacy configuration to limit access to the dataset.

10. The system of claim 9, wherein the transforming of the privacy loss distribution based on the predetermined parameter includes translating the privacy loss distribution.

11. The system of claim 10, wherein the transforming of the privacy loss distribution based on the predetermined parameter further includes after the translating of the privacy loss distribution, reflecting the privacy loss distribution.

12. The system of claim 9, wherein the transforming of the privacy loss distribution based on the integral range includes truncating the privacy loss distribution based on the integral range.

13. A non-transitory computer-readable medium having computer-executable instructions stored thereon that, upon execution, cause one or more processors to perform operations comprising:

determining a differential privacy configuration including a first privacy parameter and a second privacy parameter;

determining a privacy loss distribution;

performing a partial convolution operation of the privacy loss distribution by:

transforming the privacy loss distribution based on a predetermined parameter;

determining an integral range based on the first privacy parameter and the privacy loss distribution;

transforming the privacy loss distribution based on the integral range; and performing the partial convolution operation based on the integral range;

determining the second privacy parameter based on a result of the partial convolution operation; and controlling a dataset based on the differential privacy configuration to limit access to the dataset.

14. The computer-readable medium of claim 13, wherein the transforming of the privacy loss distribution based on the predetermined parameter includes translating the privacy loss distribution.

15. The computer-readable medium of claim 14, wherein the transforming of the privacy loss distribution based on the predetermined parameter further includes after the translating of the privacy loss distribution, reflecting the privacy loss distribution.

16. The computer-readable medium of claim 13, wherein the transforming of the privacy loss distribution based on the integral range includes truncating the privacy loss distribution based on the integral range.

17. The computer-readable medium of claim 13, wherein K is a number of convolution operations, K is greater than two, the performing of the partial convolution operation of the privacy loss distribution includes performing a K-fold partial convolution operation of the privacy loss distribution.

18. The computer-readable medium of claim 17, wherein the determining of the integral range includes determining the integral range based on the first privacy parameter, the number of convolution operations K, and the privacy loss distribution.

19. The computer-readable medium of claim 13, the operations further comprise:

adjusting a number of composition operations based on the first privacy parameter and the second privacy parameter.

20. The computer-readable medium of claim 19, wherein the adjusting of the number of composition operations includes:

decreasing the number of composition operations when the first or second privacy parameter is greater than a first predetermined threshold; and increasing the number of composition operations when the first or second privacy parameter is less than a second predetermined threshold.

* * * * *